US009008705B2

(12) United States Patent
Enomoto

(10) Patent No.: US 9,008,705 B2
(45) Date of Patent: Apr. 14, 2015

(54) PUSH DELIVERY APPARATUS, MOBILE TERMINAL, AND PUSH DELIVERY SYSTEM

(71) Applicant: NEC BIGLOBE, Ltd., Shinagawa-ku, Tokyo (JP)

(72) Inventor: Nobuyuki Enomoto, Tokyo (JP)

(73) Assignee: BIGLOBE Inc., Tokyo (JP)

( * ) Notice: Subject to any disclaimer, the term of this patent is extended or adjusted under 35 U.S.C. 154(b) by 0 days.

(21) Appl. No.: 13/709,909

(22) Filed: Dec. 10, 2012

(65) Prior Publication Data

US 2013/0225214 A1    Aug. 29, 2013

(30) Foreign Application Priority Data

Feb. 29, 2012   (JP) .................................. 2012-042627

(51) Int. Cl.
*H04W 4/14*   (2009.01)

(52) U.S. Cl.
CPC ........................................ *H04W 4/14* (2013.01)

(58) Field of Classification Search
USPC ......... 455/432.1, 466, 414.1, 414.4; 370/230, 370/252
See application file for complete search history.

(56) References Cited

U.S. PATENT DOCUMENTS

| 2004/0078813 | A1  | 4/2004  | Kobuya et al. |
| 2005/0240391 | A1* | 10/2005 | Lekutai ............................. 704/2 |
| 2010/0057945 | A1  | 3/2010  | Takahashi et al. |
| 2010/0279723 | A1  | 11/2010 | Fischer et al. |
| 2011/0150203 | A1* | 6/2011  | Stille et al. ............... 379/207.16 |

FOREIGN PATENT DOCUMENTS

| JP | 2001-188743 A  | 7/2001  |
| JP | 2002-237782 A  | 8/2002  |
| JP | 2002315059 A   | 10/2002 |
| JP | 2002532796 A   | 10/2002 |
| JP | 2004056251 A   | 2/2004  |
| JP | 4092976 B2     | 3/2004  |
| JP | 200835362 A    | 2/2008  |
| JP | 4618284 B2     | 3/2008  |
| JP | 2009060627 A   | 3/2009  |
| JP | 2009-135901 A  | 6/2009  |
| JP | 2009-541819 A  | 11/2009 |
| JP | 2010-154033 A  | 7/2010  |
| JP | 2010-204271 A  | 9/2010  |
| JP | 2011-54174 A   | 3/2011  |
| WO | 2004017565 A1  | 2/2004  |

OTHER PUBLICATIONS

Japanese Office Action for JP Application No. 2012-042627 mailed on Jan. 7, 2014 with English Translation.

(Continued)

*Primary Examiner* — Sam Bhattacharya
(74) *Attorney, Agent, or Firm* — Sughrue Mion, PLLC

(57) ABSTRACT

A push delivery apparatus according to an exemplary aspect of the present invention includes a portion for sending information indicating which of contents kept in the delivery apparatus is to be received by a mobile terminal through a packet network to the mobile terminal in a first text message through a telephone network and for delivering a second text message which is a simplified version of the content to the mobile terminal through the telephone network if the mobile terminal does not acquire the content to be received by the mobile terminal within a predetermined period of time after sending the first text message.

9 Claims, 19 Drawing Sheets

(56) References Cited

OTHER PUBLICATIONS

SMS International Roaming Service and International SMS service, NTT DoCoMo Technical Journal, vol. 13, No. 2, Jul. 2005, p. 69.

Communication dated Nov. 18, 2014, issued by the Japanese Patent Office in counterpart Application No. 2014046301.

* cited by examiner

FIG. 2

231 CONTENT MANAGEMENT TABLE

| CONTENT ID | DELIVERY PERIOD | DELIVERY DAY OF THE WEEK | DELIVERY TIME SLOT | VISITED DOMAIN MCC | SUBSCRIPTION COUNTRY CODE | STANDARD-VERSION FILE | SIMPLIFIED-VERSION FILE |
|---|---|---|---|---|---|---|---|
| 2311 | 2312 | 2313 | 2314 | 2315 | 2316 | 2317 | 2318 |
| 00001 | 20120101-20120131 | 1,2,4,5,6,7 | 1400-1700 | 525 | 81 | 00001.htm | 00001.txt |
| 00002 | 20120101-20120331 | 1,2,3,4,5,6,7 | 1800-2100 | 454 | 81 | 00002.htm | 00002.txt |
| 00003 | 20120101-20120331 | 1,2,3,4,5 | 0500-2100 | 440 | 886 | 00003.htm | 00003.txt |
| ... | ... | ... | ... | ... | ... | ... | ... |

241 CONTENT NOTIFICATION HISTORY TABLE

| NOTIFIED PARTY TELEPHONE NUMBER | CONTENT ID | NOTIFICATION DATE AND TIME |
|---|---|---|
| 819012341234 | 00001 | 20120105145123 |
| 886912123123 | 00003 | 20120105150337 |

232 EXAMPLE OF STANDARD - VERSION CONTENT

【TODAY ONLY】 TAKE A BREAK AT CAFE XXX

PHOTO

HOT CHOCOLATE RICH IN CACAO DIRECTLY IMPORTED FROM X IS NOW AVAILABLE AT A SPECIAL PRICE OF ￥100. TRY NOW!

OPEN : 10:00 - 20:00
LOCATION : MERLION PLACE
PHONE : + 65 - 0000 - 0000

MAP

FIG. 5

233 EXAMPLE OF SIMPLIFIED - VERSION CONTENT

[TODAY ONLY] TAKE A BREAK AT CAFE XXX

HOT CHOCOLATE RICH IN CACAO DIRECTLY IMPORTED FROM B IS NOW AVAILABLE AT A SPECIAL PRICE OF ￥100. TRY NOW!

OPEN : 10:00 - 20:00
LOCATION : MERLION PLACE
PHONE : + 65 - 0000 - 0000

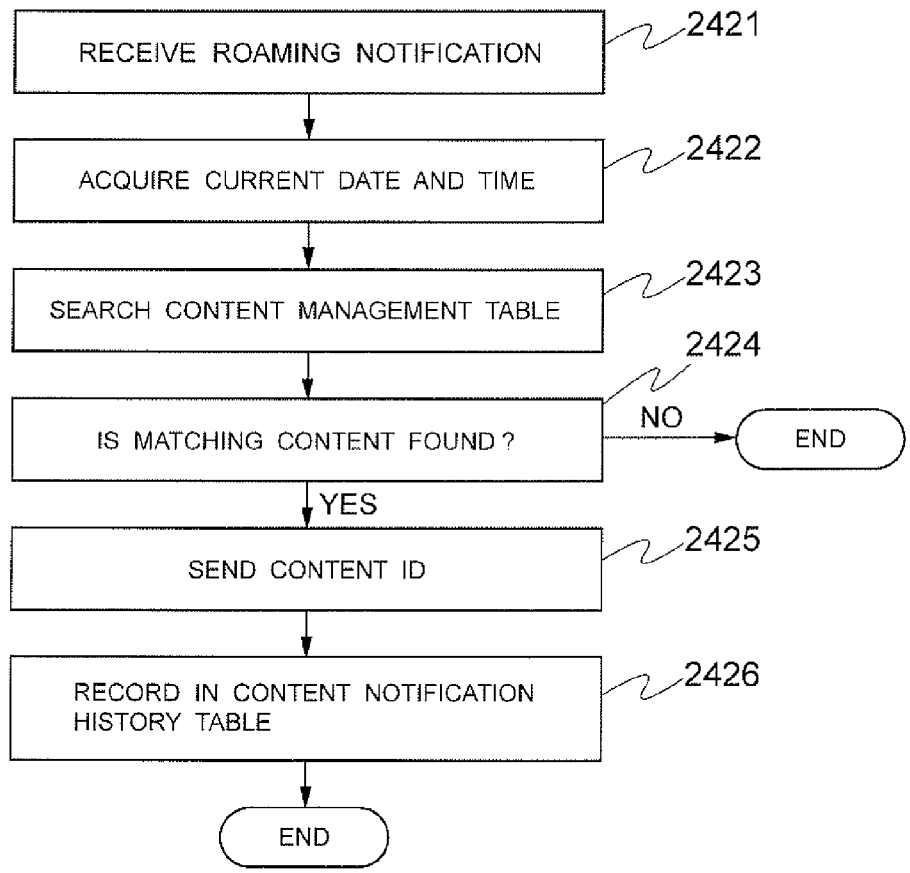
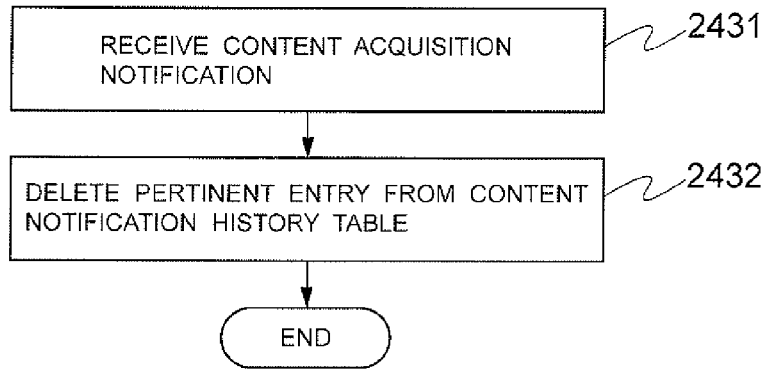

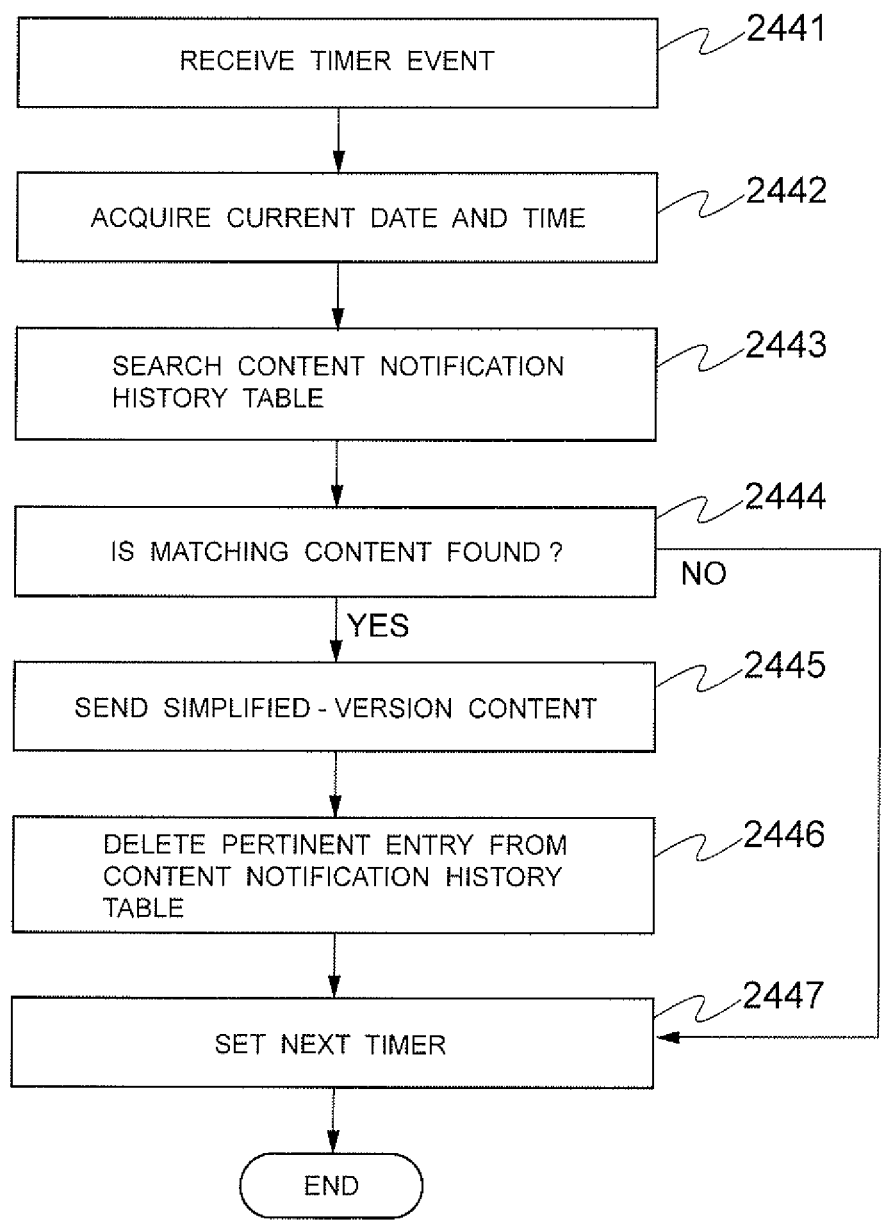

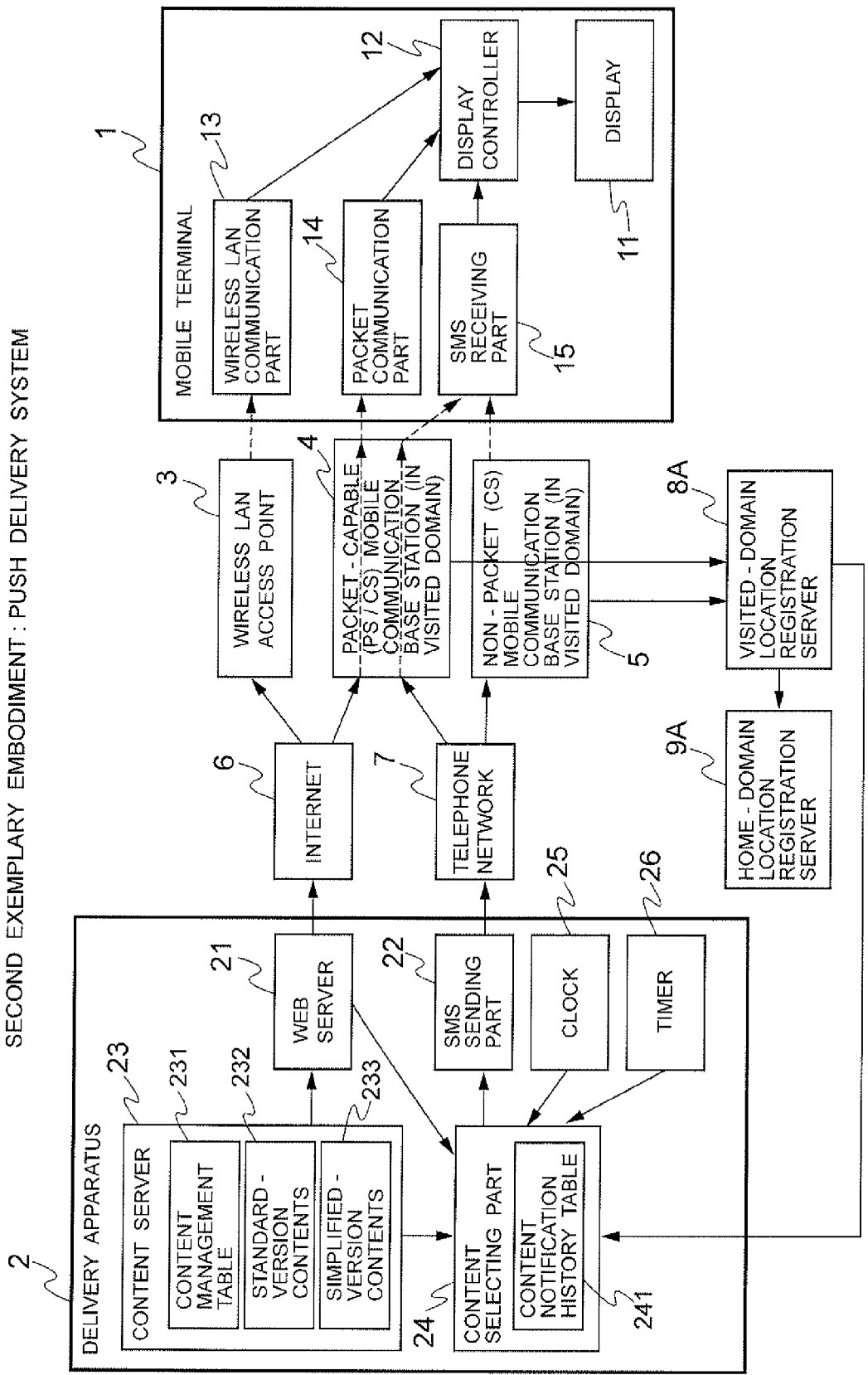

THIRD EXEMPLARY EMBODIMENT: PUSH DELIVERY SYSTEM

ROAMING NOTIFICATION RECEIVING OPERATION 242A
(CONTENT SELECTING PART 24A)

FIG. 15

161 STORED CONTENT MANAGEMENT TABLE

| CONTENT ID | STANDARD-VERSION FILE |
|---|---|
| 00001 | 00001.htm |
| 00002 | 00002.htm |
| 00003 | 00003.htm |
| ..... | ..... |

231B CONTENT MANAGEMENT TABLE

| CONTENT ID | PERIOD | DAY OF WEEK | TIME SLOT | VISITED DOMAIN MCC | SUBSCRIPTION COUNTRY CODE | STANDARD-VERSION FILE |
|---|---|---|---|---|---|---|
| 00001 | 20120101-20120131 | 1,2,4,5,6,7 | 1400-1700 | 525 | 81 | 00001.htm |
| 00002 | 20120101-20120331 | 1,2,3,4,5,6,7 | 1800-2100 | 454 | 81 | 00002.htm |
| 00003 | 20120101-20120331 | 1,2,3,4,5 | 0500-2100 | 440 | 886 | 00003.htm |
| ... | ... | ... | ... | ... | ... | ... |

2311  2312  2313  2314  2315  2316  2317

241B CONTENT HOLDER LIST

| CONTENT HOLDER (2411B) | LAST DOWNLOAD DATE AND TIME (2412B) |
|---|---|
| 819012341234 | 20120103234512 |
| 886912123123 | 20120105210337 |

SMS RECEIVING OPERATION 121B
(DISPLAY CONTROLLER 12B)

CONTENT STORING OPERATION 163
(CONTENT STORING PART 16)

ROAMING NOTIFICATION RECEIVING OPERATION 242B
(CONTENT SELECTING PART 24B)

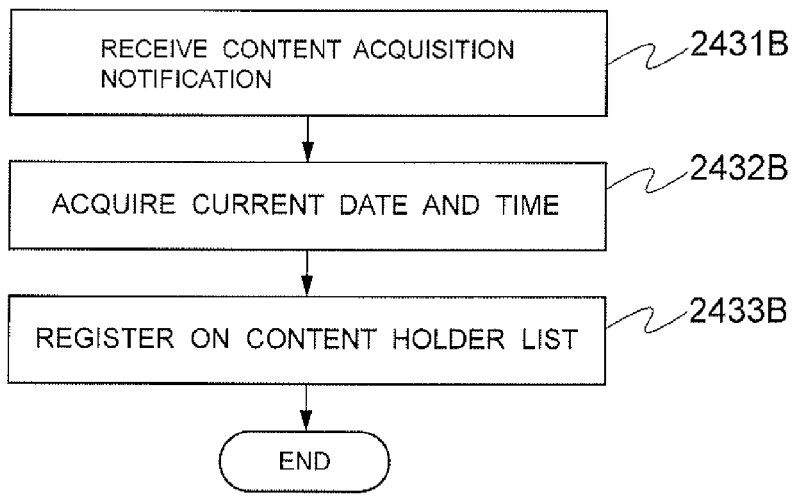
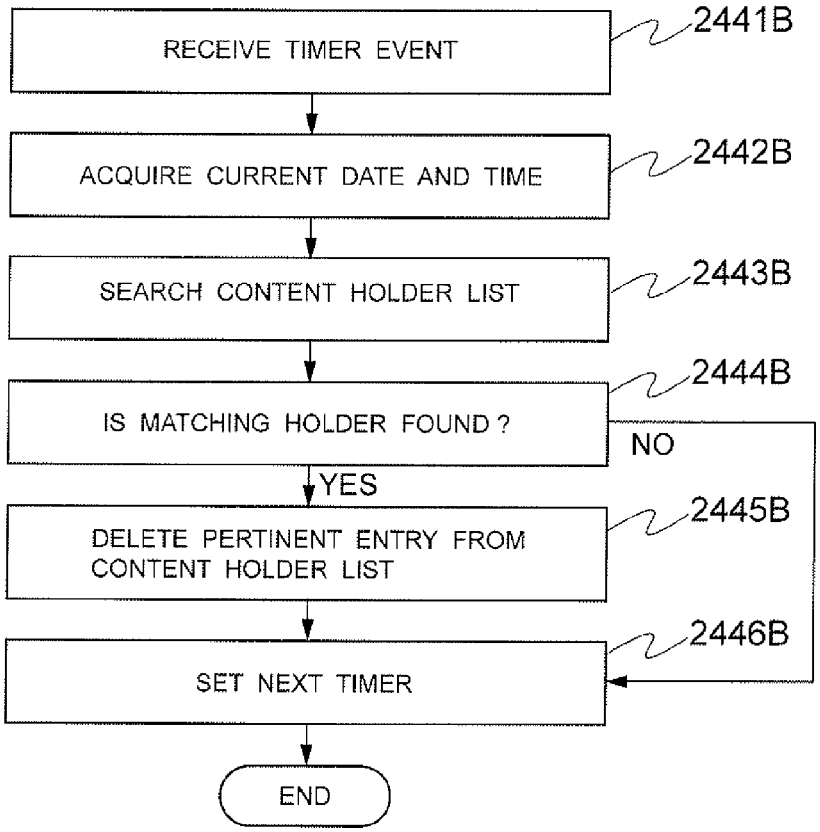

US 9,008,705 B2

PUSH DELIVERY APPARATUS, MOBILE TERMINAL, AND PUSH DELIVERY SYSTEM

INCORPORATION BY REFERENCE

This application is based upon and claims the benefit of priority from Japanese patent application No. 2012-042627, filed on Feb. 29, 2012, the disclosure of which is incorporated herein in its entirety by reference.

BACKGROUND OF THE INVENTION

1. Field of the Invention

The present invention relates to a push delivery apparatus, a mobile terminal, and a push delivery system and, in particular, to a push delivery apparatus, a mobile terminal, and a push delivery system that provide a content based on the location of a user and up-to-date information to the user when a packet network is not available.

2. Description of the Related Art

The art related to the present invention will be described first. Patent Literature 1 (Japanese Patent Application Laid-Open No. 2009-060627) describes a technique in which when a mobile terminal sends location information measured by the mobile terminal to a server, the server selects displayable information and sends the information back to the mobile terminal Patent Literature 2 (Japanese Patent Application Laid-Open No. 2002-315059) describes a technique in which when a mobile terminal sends measured location information to a server, the server selects information that can be displayed at the current time and notifies the mobile terminal of the information.

Patent Literatures 3 (Japanese Patent No. 4092976) and 4 (Japanese Patent No. 4618284) disclose techniques to display a content stored previously on a mobile terminal in accordance with a location measured by the mobile terminal. Patent Literature 5 (Japanese Patent Application Laid-Open No. 2004-056251) discloses a technique to estimate an approximate location of a terminal on the basis of the location of a base station serving the terminal. According to the technique disclosed in Patent Literature 5, an approximate location of a terminal can be estimated even if the terminal does not have a position measuring facility.

Patent Literature 6 (Japanese Patent Application Laid-Open No. 2002-532796) discloses a technique relating to transmission of short messages in which data in a short message containing information concerning the structure or content of the short message is sent to enable determination as to whether all of the message should be downloaded or only part of the message should be downloaded.

Non-Patent Literature 1 (SMS International Roaming Service and International SMS service, NTT DoCoMo Technical Journal, Vol. 13, No. 2, July 2005, p. 69, retrieved online on Jan. 13, 2012, Internet <URL: http://www.nttdocomo.cajp/binay/pdf/corporate/technology/rd/technical_journal/bn/vol13_2/vol13_2_068jp.pdf>), which provides an overview of an international roaming service technique, discloses that in some regions, only voice calls and SMS, which use circuit switching, are available and packet communications using packet switching (that is, Internet connections) are not available.

However, the techniques described in Patent Literatures 1 and 2 cannot be used when the mobile terminal is in an area where the mobile terminal cannot connect to a packet network, such as when the mobile terminal is roaming abroad, because the techniques use the Internet to send location information from the mobile terminal to the server and to deliver information from the server to the mobile terminal.

The techniques described in Patent Literatures 3 and 4, which display information stored on a mobile terminal beforehand, cannot display information based on up-to-date information for example when a store that has a content created and stored on the mobile terminal has unexpectedly shut down or changed its regular closing day.

Patent Literature 5 described above discloses no technique relating to content delivery in areas where a packet network is not available. The technique described in Patent Literature 6 is intended to enable selection as to whether all or part of a short message should be downloaded and is completely different in object and configuration from the technique of the present invention, which is intended to enable selection as to whether all or part of web data is to be received.

The technique described in Non-Patent Literature 1 does not disclose content delivery in areas where a packet network is not available.

SUMMARY OF THE INVENTION

An exemplary object of the present invention is to provide a push delivery apparatus, a mobile terminal, and a push delivery system that are capable of providing a content based on the location of a user and up-to-date information to the user when a packet network is not available.

A push delivery apparatus according to an exemplary aspect of the present invention includes a portion for sending information indicating which of contents kept in the delivery apparatus is to be received by a mobile terminal through a packet network to the mobile terminal in a first text message through a telephone network and for delivering a second text message which is a simplified version of the content to the mobile terminal through the telephone network if the mobile terminal does not acquire the content to be received by the mobile terminal within a predetermined period of time after sending the first text message.

A mobile terminal according to an exemplary aspect of the present invention includes a portion for receiving, from a delivery apparatus through a telephone network, information indicating which of contents kept in the delivery apparatus is to be received by the mobile terminal through a packet network in a text message when the mobile terminal roams out and, if the mobile terminal cannot receive a content specified by the delivery apparatus, for acquiring a text message which is a simplified version of the content from the delivery apparatus through the telephone network.

A push delivery system according to an exemplary aspect of the present invention includes a push delivery apparatus including a content selecting part for determining a content ID indicating a content to be displayed and a timing of displaying the content, an SMS sending part for sending a text message including the content ID and an identifier indicating that the text message includes the content ID, a Web server for issuing a content acquisition notification including a telephone number of a terminal which has acquired a content and a content ID of the content when the content has been acquired, and a timer for activating a procedure for checking arrival of the content acquisition notification at a set time; and a mobile terminal including an SMS receiving part for receiving a text message including a content ID indicating a content to be displayed and an identifier indicating that the text message includes the content ID or a concatenated SMS message including a simplified-version of the content and an identifier indicating that the message includes the simplified-version of the content, a wireless LAN communication part for communicating with the Web server through a wireless LAN, a packet communication part for communicating with the Web server through a packet network, and a display controller for acquiring and displaying the content corresponding to the content ID included in the text message from the Web server and for displaying the simplified-version content included in the concatenated SMS message;

wherein the content selecting part sends a concatenated SMS message including a simplified-version content to the mobile terminal if a content acquisition notification does not arrive from the Web server within a predetermined period of time after sending the text message from the SMS sending part.

BRIEF DESCRIPTION OF THE DRAWINGS

FIG. 2 is a diagram illustrating an example of a content management table 231 which is recorded on a content server 23 and lists contents kept in a content server 23;

FIG. 5 is a diagram illustrating an example of a simplified-version content 233 kept in the content server 23;

FIG. 7 is a flowchart illustrating an example of a roaming notification receiving operation 242 in a content selecting part 24;

FIG. 8 is a flowchart illustrating an example of a content acquisition notification receiving operation 243 in the content selecting part 24;

FIG. 9 is a flowchart illustrating an example of timer event receiving operation 244 in the content selecting part 24;

FIG. 10 is a block diagram of a push delivery system according to a second exemplary embodiment of the present invention;

FIG. 15 is a diagram illustrating a stored content management table 161 which is recorded in the content storing part 16 and lists contents stored in the content storing part 16;

FIG. 16 is a diagram illustrating an example of a content management table 231B which is recorded in the content server 23 and lists contents kept in the content server 23;

FIG. 21 is a flowchart illustrating an example of a content acquisition notification receiving operation 243B in the content selecting part 24B; and FIG. 22 is a flowchart illustrating an example of a timer event receiving operation 244B in the content selecting part 24B.

EXEMPLARY EMBODIMENTS

Exemplary embodiments of the present invention will be described with reference to the accompanying drawings. A first exemplary embodiment will be described first. In the first exemplary embodiment, when a mobile terminal 1 is in a region where a packet network is not available or when data roaming rejection is set on the mobile terminal 1, the mobile phone carrier to which the mobile terminal 1 subscribes (with which the mobile terminal 1 has a service agreement) or a service provider having an agreement with the mobile phone carrier pushes information to the mobile terminal 1 located in the area of a visited network (that is, the roaming-out mobile terminal).

Figure 1:
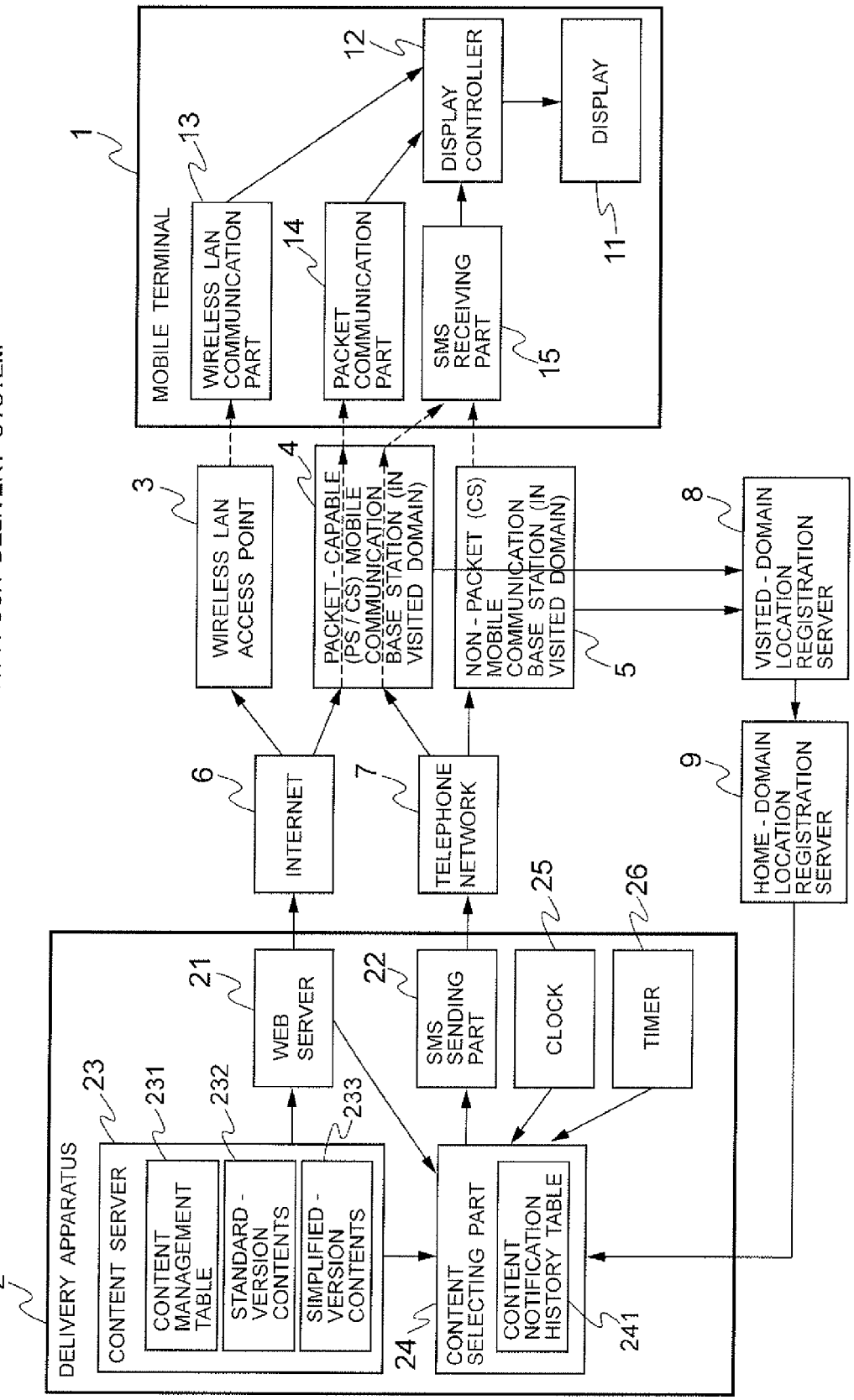
FIG. 1 is a block diagram of a push delivery system according to a first exemplary embodiment of the present invention.

FIG. 1 is a block diagram illustrating a push delivery system according to a first exemplary embodiment of the present invention. The push delivery system according to the first exemplary embodiment will be described with reference to FIG. 1.

The push delivery system according to this exemplary embodiment includes a mobile terminal 1, a delivery apparatus 2, a wireless LAN access point 3, a packet-capable mobile communication base station 4, a non-packet mobile communication base station 5, the Internet 6, a telephone network 7, a visited-domain location registration server 8, and a home-domain location registration server 9.

The mobile terminal 1 includes a display 11, a display controller 12, a wireless LAN communication part 13, a packet communication part 14, and an SMS receiving part 15. Examples of the mobile terminal 1 include smartphones (multifunctional mobile phones) and tablet devices. The mobile terminal 1 has a telephone number for sending and receiving SMS messages and voice calls through the telephone network 7.

The display 11 is a portion displaying information specified by the display controller 12. The display controller 12 performs an SMS receiving operation 121 for receiving a notification of a content ID from the SMS receiving part 15, receiving a standard-version content from the wireless LAN communication part 13 or the packet communication part 14 and displaying the standard-version content on the display 11 or displaying a simplified-version content arriving from the SMS receiving part 15 on the display 11.

Specifically, the display controller 12 is provided in the form of an application software to be installed on a smartphone (multifunctional mobile phone) or a tablet device. The wireless LAN communication part 13 communicates with the wireless LAN access point 3 to enable the display controller 12 to communicate with the Web server 21 or other servers through the Internet 6. If communication cannot be established because the mobile terminal 1 is out of the service area of the wireless LAN access point 3 or for other reasons, the wireless LAN communication part 13 notifies the display controller 12 of the connect failure.

The packet communication part 14 communicates with the packet-capable mobile communication base station 4 to enable the display controller 12 to communicate with the Web server 21 or other servers through the Internet 6. If communication cannot be established because the mobile terminal 1 is out of the service area of the packet-capable mobile communication base station 4 or for other reasons, the packet communication part 14 notifies the display controller 12 of the connect failure.

The SMS receiving part 15 communicates with the packet-capable mobile communication base station 4 or the non-packet mobile communication base station 5, receives an SMS (short message service) message through the telephone network 7, and provides the SMS message to the display controller 12. When the SMS message received is a part of a concatenated SMS message, the SMS receiving part 15 concatenates the split SMS messages before providing the concatenated SMS message to the display controller 12.

The delivery apparatus 2 includes a Web server 21, an SMS sending part 22, a content server 23, a content selecting part 24, a clock 25, and a timer 26. The delivery apparatus 2 has a telephone number for sending and receiving SMS messages and voice calls through the telephone network 7. The delivery apparatus 2 may be located in the country where the mobile terminal 1 subscribes to the service or in a visited domain.

In response to a content acquisition request provided from the mobile terminal 1 through the Internet 6, the Web server 21 retrieves a content corresponding to a content ID presented in the request from the content server 23 and sends the content to the mobile terminal 1 through the Internet 6. When the Web server 21 receives a content acquisition request from the mobile terminal 1 through the Internet 6, the Web server 21 sends a content acquisition notification including the telephone number of the mobile terminal 1 and the content ID to the content selecting part 24.

The SMS sending part 22 sends a message containing information indicated by the content selecting part 24 to the mobile terminal that has a telephone number indicated by the content selecting part 24 through the telephone network 7. If the size of the message containing information indicated by the content selecting part 24 exceeds the maximum size allowed to be sent in SMS (70 to 140 characters or so), the SMS sending part 22 splits the message into multiple SMS messages and sends the messages in what is known as "concatenated SMS".

The content server 23 includes a content management table 231, standard-version contents 232, and simplified-version contents 233. In response to a request from the content selecting part 24, the content server 23 refers to the content management table 231 listing the contents kept in the content server 23 and sends back a content that meets criteria. In response to a request from the content selecting part 24, the content server 23 retrieves a simplified-version content 233 and presents the simplified-version content 233 to the content selecting part 24. Furthermore, in response to a request from the Web server 21, the content server 23 retrieves a standard-version content 232 and presents the standard-version content 232 to the Web server 21.

The content selecting part 24 includes a content notification history table 241 and performs a roaming notification receiving operation 242, a content acquisition notification receiving operation 243, and a timer event receiving operation 244.

The content notification history table 241 is a table for recording the telephone numbers of mobile terminals notified of contents IDs, the notified contents ID, and notification dates and times. The roaming notification receiving operation 242 receives a roaming-in event or roaming-out event from a control network, refers to the content management table 231 in the content server 23 to find a content that meets criteria, and instructs the SMS sending part 22 to send the content ID of the found content to the telephone number of the mobile terminal 1 provided with notification from the control network. In this operation, the notified party telephone number, the content ID, and the notification date and time are recorded in the content notification history table 241 in the content selecting part 24.

The content acquisition notification receiving operation 243 deletes a pertinent entry from the content notification history table 241 when a content acquisition notification is received from the Web server 21.

When a timer event is received from the timer 26, the timer event receiving operation 244 checks the content notification history table 241. If a predetermined time or more has elapsed since the date and time of notification of a content ID, the timer event receiving operation 244 determines that the mobile terminal 1 cannot acquire a standard-version content through the Internet, acquires a simplified-version content from the content server 23 and instructs the SMS sending part 22 to send the simplified-version content to the telephone number of the mobile terminal 1.

The timer event receiving operation 244 then sets the timer 26 so as to generate a timer event again in a predetermined period of time. Note that the size of a simplified-version content can exceed the maximum size allowed to be sent in SMS (70 to 140 characters or so). In that case, the SMS sending part 22 splits the content into multiple SMS messages and send the SMS messages in what is known as "concatenated SMS".

In response to a request from the content selecting part 24, the clock 25 sends back the current year, month, day, hour, minute and second. The current year, month, day, hour, minute and second is constantly accurately kept track of by using NTP (Network Time Protocol) or other means.

The timer 26 notifies the content selecting part 24 of a timer event at a date and time specified by the content selecting part 24.

The wireless LAN access point 3 connects the mobile terminal 1 to the Internet 6 through a wireless LAN. The wireless LAN access point 3 is installed at homes, offices, hotels, cafes, utility poles or the like and transmits and receives a radio wave that covers a range of several meters to several hundred meters as a service area.

The packet-capable mobile communication base station 4 is a mobile communication base station that supports both of packet switching (PS) and circuit switching (CS). The packet-capable mobile communication base station 4 is installed by a service provider having an agreement with the mobile phone carrier to which the mobile terminal 1 subscribes. That is, the packet-capable mobile communication base station 4 is installed in a domain visited by the mobile terminal 1.

The packet-capable mobile communication base station 4 connects the mobile terminal 1 to the Internet 6 through packet switching (such as HSPA (High Speed Packet Access), EDGE (Enhanced Data GSM Environment, or LTE (Long Term Evolution)). The packet-capable mobile communication station 4 also connects the mobile terminal 1 to the telephone network 7 through circuit switching. When the packet-capable mobile communication base station 4 detects the mobile terminal 1 in its service area or receives a request from the mobile terminal 1, the packet-capable mobile communication base station 4 registers the mobile terminal 1 in the visited-domain location registration server 8. When registering the mobile terminal 1, the packet-capable mobile communication base station 4 provides information such as the telephone number of the mobile terminal 1 and the base station ID of the packet-capable mobile communication base station 4 to the visited-domain location registration server 8.

The non-packet mobile communication base station 5 is a mobile communication base station that supports only CS (circuit switching). The non-packet mobile communication base station 5 is a mobile communication base station installed by a service provider having an agreement with the mobile phone carrier to which the mobile terminal 1 subscribes, that is, a mobile communication base station installed in a visited domain visited by the mobile terminal 1. The non-packet mobile communication base station 5 connects the mobile terminal 1 to the telephone network 7 through circuit switching.

When detecting the mobile terminal 1 in the service area of the non-packet mobile communication base station 5 or receiving a request from the mobile terminal 1, the non-packet mobile communication base station 5 registers the mobile terminal 1 in the visited-domain location registration server 8. When registering the mobile terminal 1, the non-packet mobile communication base station 5 provides information such as the telephone number of the mobile terminal 1 and the base station ID of the non-packet mobile communication base station 5 to the visited-domain location registration server 8.

The Internet 6 is a network capable of transferring data in packets to a destination specified by an IP address. Here, the term Internet 6 refers to the Internet that uses global IP addresses.

The telephone network 7 is a network that transmits a voice call or a message (SMS) to a destination specified by a telephone number through the use of circuit switching.

The visited-domain location registration server 8 is a device that manages presence information concerning mobile terminals 1 in a visited domain. The visited-domain location registration server 8 receives the presence information (location registration information) concerning a mobile terminal 1 from the packet-capable mobile communication base station 4 or the non-packet mobile communication base station 5 through a common channel signaling network (such as SS7) and determines a base station to call upon arrival of an incoming voice call or other message.

If the mobile phone carrier to which the mobile terminal 1 subscribes is not the mobile phone carrier of the visited-domain location registration server 8 (in the case of roaming-in as viewed from the visited domain service provider), the visited-domain location registration server 8 registers the mobile terminal 1 in the home-domain location registration server 9 of the mobile terminal 1. When registering the mobile terminal 1, the visited-domain location registration server 8 provides information such as the telephone number of the mobile terminal 1, the MCC (Mobile Country Code) and MNC (Mobile Network Code) of the network to which the visited-domain location registration server 8 belongs to the home-domain location registration server 9. The MCC and MNC used herein are defined in ITU-T recommendation E.212.

The home-domain location registration server 9 is a device that manages presence information concerning the mobile terminal 1. The home-domain location registration server 9 receives presence information (location registration information) concerning the mobile terminal 1 from the visited-domain location registration server 8 through a common channel signaling network (such as SS7) and determines a base station to call upon arrival of an incoming voice call or other message.

When the home-domain location registration server 9 detects a roaming-out viewed from the home-domain location registration server 9 (that is, when receiving location registration from the visited-domain location registration server 8), the home-domain location registration server 9 provides the telephone number of a mobile terminal 1 that has roamed out and the MCC of the presence area (the visited domain) to the content selecting part 24.

FIG. 2 is a diagram illustrating an example of the content management table 231 which is recorded on the content server 23 and lists the contents kept in the content server 23. The content management table 231 includes a content ID 2311, a delivery period 2312, a delivery day of the week 2313, a delivery time slot 2314, a visited domain MCC 2315, a subscription country code 2316, a standard-version file 2317, and a simplified-version file 2318.

The content ID 2311 is an ID that uniquely identifies a content kept in the content server 23. The delivery period 2312 is an entry for setting the start date and end date of delivery of the content to mobile terminals 1. For example, if the content is related to a campaign, the entry is used to limit the information delivery to the period of the campaign.

The delivery day of the week 2313 is an entry for setting the day of the week on which the content is delivered to mobile terminals 1. For example, if the content relates to a store or a restaurant, the entry is used to exclude the regular closing day of the store or restaurant from the information delivery. Here, Monday is represented by 1, Tuesday is represented by 2, Wednesday is represented by 3, Thursday is represented by 4, Friday is represented by 5, Saturday is represented by 6 and Sunday is represented by 7.

The delivery time slot 2314 is an entry for setting the start time and end time of delivery of the content to mobile terminals 1. For example, if the content relates to afternoon tea, the entry is used to limit information delivery to the afternoon hours.

The visited domain MCC 2315 is an entry for setting the country code of a delivery destination network (MCC: Mobile Country Code). For example, if information is to be delivered to subscriber terminals visiting Singapore, the MCC of Singapore, 525, is set here. MCC used here is defined in ITU-T recommendation E.212.

The subscription country code 2316 is an entry for setting the international telephone country code of the country of the subscriber of an information delivery destination terminal. For example, when information is to be delivered to a subscriber terminal that has a service agreement in Japan, the international telephone country code of Japan, 81, is set here. Country code used here is defined in ITU-T recommendation E.164.

The standard-version file 2317 is an entry for specifying the file name of a content to be delivered through the Internet 6. The simplified-version file 2318 is an entry for specifying the file name of a simplified-version content to be delivered through the telephone network 7 when delivery of a standard-version content through the Internet 6 is impossible.

Figure 3:
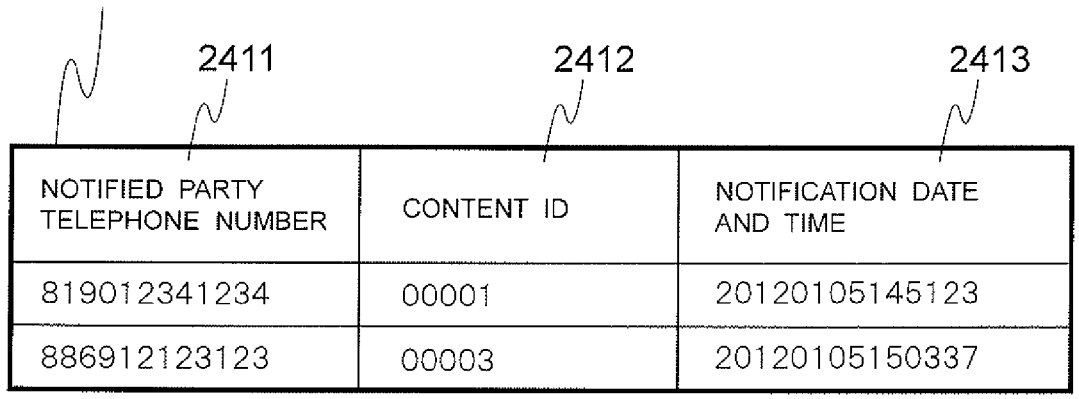
FIG. 3 is a diagram illustrating a content notification history table 241 which is recorded on a content selecting part 24 and contains a history of notifications of content IDs to mobile terminals 1.

FIG. 3 illustrates an example of a content notification history table 241 which is recorded in the content selecting part 24 and contains a history of notifications of content IDs to mobile terminals 1. The content notification history table 241 includes a notified party telephone number 2411, a content ID 2412, and a notification date and time 2413.

The notified party telephone number 2411 is a field containing the telephone number of a recipient to which a content ID is notified. The content ID 2412 is a field containing a content ID notified. The notification date and time 2413 is a field containing the date and time of notification of a content ID.

Figure 4:
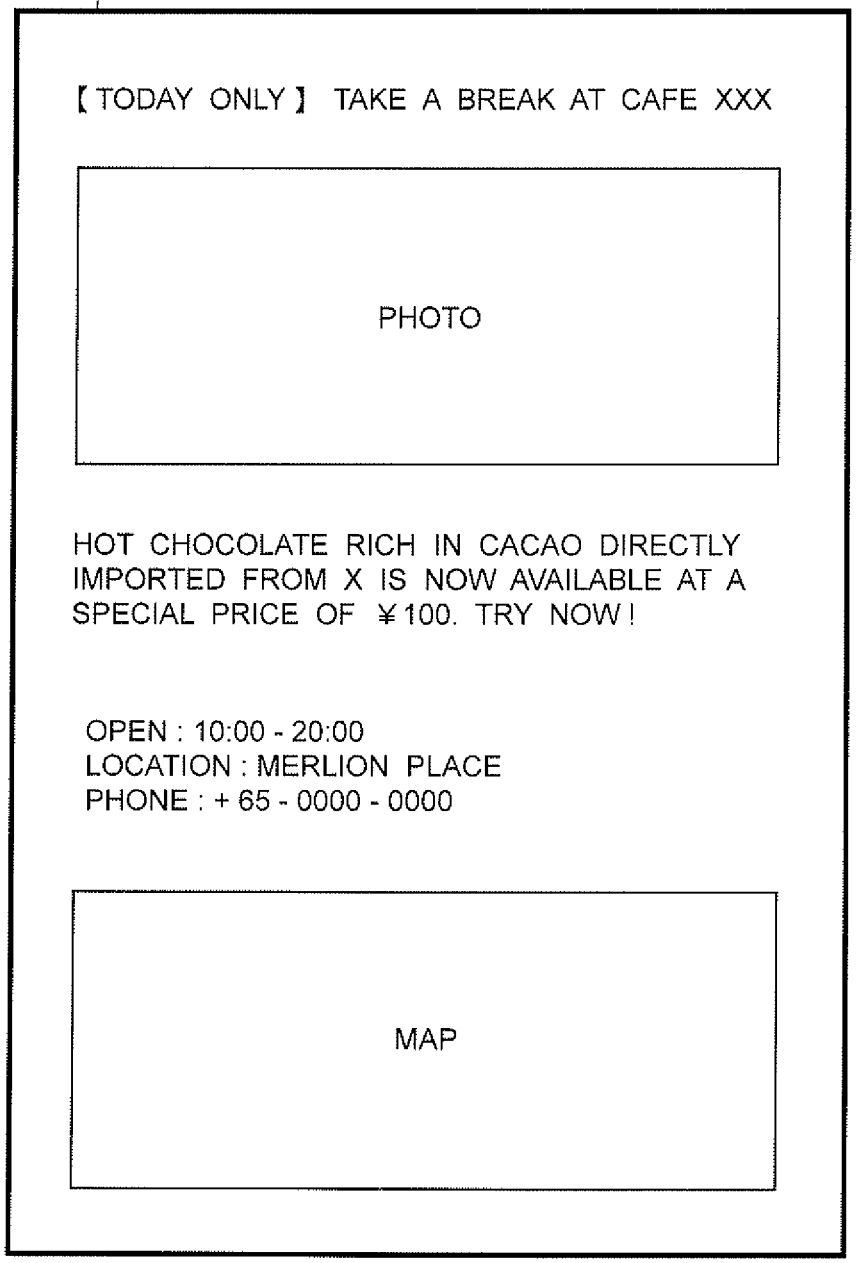
FIG. 4 is a diagram illustrating an example of a standard-version content 232 kept in the content server 23.

FIG. 4 illustrates an example of a standard-version content 232 kept in the content server 23. The standard-version content 232 is a large size content sent to mobile terminals 1 through the Internet 6. For example, FIG. 4 illustrates an exemplary standard-version file, 00001.htm, corresponding to content ID 00001, which provides a rich representation including photograph and map images.

FIG. 5 illustrates an example of a simplified-version content 233 kept in the content server 23. The simplified-version content 233 is a small size content to be sent to mobile terminals 1 through the telephone network 7. For example, FIG. 5 illustrates an exemplary simplified-version file, 00001.txt, corresponding to content ID "00001", which provides a simple representation containing only text.

Figure 6:
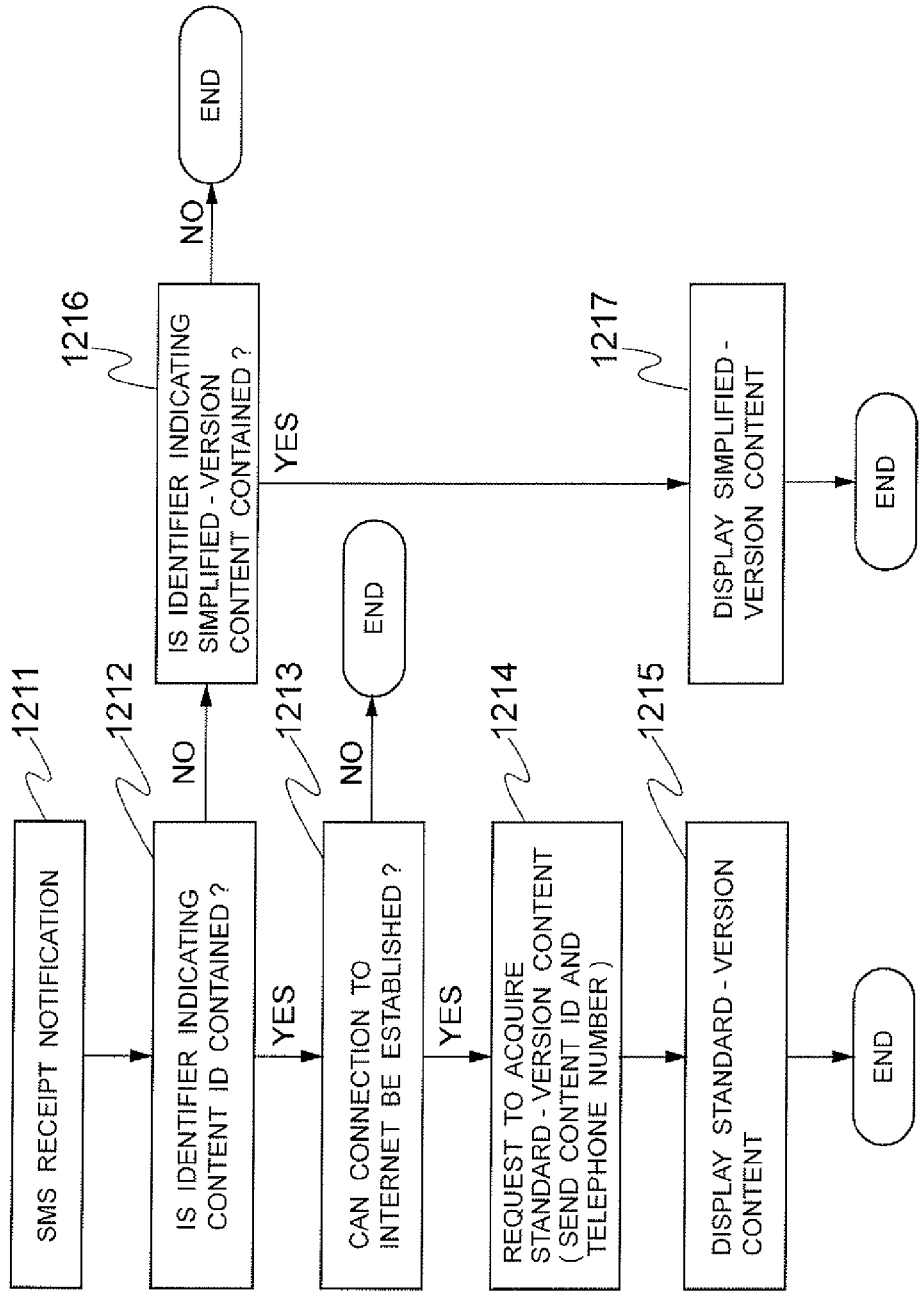
FIG. 6 is a flowchart illustrating an example of an SMS receiving operation 121 in a display controller 12.

FIG. 6 is a flowchart illustrating an example of the SMS receiving operation 121 in the display controller 12. Referring to FIG. 6, when the display controller 12 receives an SMS receipt notification from the SMS receiving part 15, the SMS receiving operation 121 is activated to acquire the body of an SMS message received and kept in the SMS receiving part 15 (step 1211).

If the SMS message body acquired at step 1211 contains an identifier (for example PUSH) indicating a content ID (if YES at step 1212), the operation proceeds to step 1213. On the other hand, the SMS message body does not contain the identifier (for example PUSH) indicating a content ID (if NO at step 1212), the operation proceeds to step 1216.

If the identifier indicating a content ID is found at step 1212 (if YES at step 1212), the operation asks the wireless LAN communication part 13 and the packet communication part 14 whether connection to the Internet 6 can be established or not (step 1213).

If the wireless LAN communication part 13 and/or the packet communication part 14 can connect to the Internet 6 (that is, communication with the Web server 21 is possible) (if YES at step 1213), the operation proceeds to step 1214.

On the other hand, neither of the wireless LAN communication part 13 and the packet communication part 14 can connect to the Internet 6 (that is, communication with the Web server 21 is impossible) (if NO at step 1213), the SMS receiving operation 121 ends.

If it is determined at step 1213 that connection to the Internet 6 can be established (if YES at step 1213), the content ID acquired at step 1212 and the telephone number of the mobile terminal 1 are sent to the Web server 21 through the wireless LAN communication part 13 or the packet communication part 14 over the Internet 6 and acquires a standard-version content 232 corresponding to the content ID (step 1214). Then the standard-version content acquired at step 1214 is displayed on the display 11 (step 1215).

If the identifier indicating a content ID is not found at step 1212 (if No at step 1212), the acquired SMS message body is checked for an identifier (for example CONT) indicating a simplified-version content (step 1216). If the acquired SMS message body contains the identifier (for example CONT) indicating a simplified-version content (if YES at step 1216), the simplified-version content acquired at step 1216 is displayed on the display 11 (step 1217).

On the other hand, the SMS message body does not contain the identifier (for example CONT) indicating a simplified-version content (if NO at step 1216), the SMS receiving operation 121 ends.

FIG. 7 is a flowchart illustrating an example of the roaming notification receiving operation 242 in the content selecting part 24. When the content selecting part 24 receives a roaming-out notification containing the telephone number of a mobile terminal 1 that has roamed out and the MCC of a presence area (visited domain) from the home-domain location registration server 9, the roaming notification receiving operation 242 is activated (step 2421).

The content selecting part 24 acquires the current year, month, day, hour, minute and second from the clock 25 (step 2422). The content selecting part 24 searches the content management table 231 using the country code of the subscription country which can be determined from the telephone number of the mobile terminal 1 received at step 2421, the MCC of the visited domain received at step 2421, the current date, time and day of the week acquired at step 2422 as keys to retrieve the ID of a content that meets the criteria (step 2423).

If one or more contents that meet the criteria are found at step 2423, the operation proceeds to step 2425. If no content that meets the criteria is found, the roaming notification receiving operation 242 ends (step 2424).

The ID of the content that meets the criteria is sent to the telephone number of the mobile terminal 1 received at step 2421 through the SMS sending part 22 along with the identifier (for example PUSH) indicating the content ID (step 2425).

The record of the notification of the content ID is registered in the content notification history table 241. The telephone number of the mobile terminal 1 received at step 2421 is registered in the notified party telephone number 2411 and the content ID notified at step 2425 is registered in 2412. The year, month, day, hour, minute and second of the time of the notification is registered in the notification date and time 2413 (step 2426).

FIG. 8 is a flowchart illustrating an example of the content acquisition notification receiving operation 243 in the content selecting part 24. When the content selecting part 24 receives a content acquisition notification including the telephone number of a mobile terminal that has received a standard-version content and a content ID from the Web server 21, the content acquisition notification receiving operation 243 is activated (step 2431).

The content selecting part 24 searches the content notification history table 241 using the telephone number and the content ID received at step 2431 as keys, deletes an entry that meets criteria, and then ends the content acquisition notification receiving operation 243 (step 2432)

FIG. 9 is a flowchart illustrating an example of the timer event receiving operation 244 in the content selecting part 24. When the content selecting part 24 receives a timer event from the timer 26, the timer event receiving operation 244 is activated (step 2441).

The content selecting part 24 acquires the current year, month, day, hour, minute and second from the clock 25 (step 2442). The content selecting part 24 searches the content notification history table 241 for an entry in which the time elapsed between the notification date and time and the current date and time is equal to or greater than a predetermined period of time (for example five minutes) by using the current date and time acquired at step 2442 as a key (step 2443).

If one or more entries that match the criteria are found at step 2443, the operation proceeds to step 2445. On the other hand, no entry that matches the criteria is found, the operation proceeds to step 2447 (step 2444).

A simplified-version content 233 associated with the content ID contained in the entry found at step 2443 is acquired from the content server 23 and is sent to the telephone number of the mobile terminal 1 contained in the entry found at step 2443 through the SMS sending part 22 (step 2445).

The entry found at step 2443 is deleted (step 2446). The timer 26 is set so that the timer event receiving operation 244 will be activated after a predetermined time period (for example five minutes) and then the timer event receiving operation 244 ends (step 2447).

Referring to FIG. 1, a method for push delivery using the present system will be described in detail.

A first example in the first exemplary embodiment will be described first. The first example relates to information delivery to a roaming-out terminal that is rejecting the use of data roaming. The first example will be described in which when the owner of a mobile terminal 1 that has a telephone number, 09012341234, and a service agreement in Japan (country code 81) has roamed out into Singapore (MCC 525) with the mobile terminal 1 and information is delivered to the roaming-out terminal 1.

It is assumed here that an administrator of the delivery apparatus 2 has been registered the standard-version content and the simplified-version content illustrated in FIGS. 4 and 5 in the content server 23 beforehand and has set the delivery conditions including the delivery periods, days of weeks, time slots, visited domain MCCs and subscription country codes illustrated in FIG. 2.

It is also assumed that the mobile terminal 1 automatically sets a roaming destination network but data roaming is disabled on the mobile terminal 1. The timer event receiving operation 244 has been performed on activation of the delivery apparatus 2 and is subsequently performed at regular intervals (for example at intervals of five minutes).

"Location Registering Operation"

When the owner of the mobile terminal 1 having a service agreement in Japan (country code "81") and a telephone number, 09012341234, brings the mobile terminal 1 into Singapore (MCC "525") and powers on the mobile terminal 1, the SMS receiving part 15 registers presence information in the visited-domain location registration server 8 through the non-packet mobile communication base station or the packet-capable mobile communication base station 4. During the registration, the ID (MCC/MNC: for example 525-01) of the network where the mobile terminal 1 is located and the subscriber number (819012341234) are provided to the visited-domain location registration server 8 through a common channel signaling network.

The visited-domain location registration server 8 receives the presence information (location registration information) of the mobile terminal 1 from the packet-capable mobile communication base station 4 or the non-packet mobile communication base station 5 through the common channel signaling network (such as SS7). Since in this instance the mobile phone carrier to which the mobile terminal 1 subscribes, which can be identified from the telephone number of the mobile terminal 1, is not the mobile phone carrier managing the visited-domain location registration server 8 (roaming-in as viewed from the carrier managing the visited-domain location registration server 8), the location information is registered in the home-domain location registration server 9 of the mobile terminal 1. The visited-domain location registration server 8 provides the telephone number (819012341234) of the mobile terminal 1 and the MCC (525) and MNC (01) of the network to which the visited-domain location registration server 8 belongs to the home-domain location registration server 9.

The home-domain location registration server 9 receives the presence information (location registration information) of the mobile terminal 1 from the visited-domain location registration server 8 through the common channel signaling network (such as SS7). In response to the registration of the presence information, the home-domain location registration server 9 detects that the subscriber to its service has roamed out into a network of Singapore. Then the home-domain location registration server 9 provides the MCC of the visited domain (525) and the subscriber number (819012341234) to the content selecting part 24.

When the content selecting part 24 receives the MCC (525) of the visited domain and the subscriber number (819012341234) from the location registration server 9, the content selecting part 24 searches the content management table 231 for a content that meets criteria by using the current date, day of the week and time, the MCC of the visited country, and the subscription country code as the keys. Here, the content selecting part 24 makes the search using the criteria, Jan. 5, 2012, Thursday (day-of-the-week code "4"), 14:51:23, visited domain MCC "525", and subscription country code "81" to obtain a content ID "00001" (see FIG. 2).

The content selecting part 24 sends an SMS message having a body including the content ID (00001) obtained as a result of searching the content management table 231 and an identifier (for example PUSH) indicating that the message is a push delivery SMS message to the subscriber number 819012341234 through the SMS sending part 22. The content selecting part 24 records the notified party telephone number (819012341234), the content ID (00001) and the notification date and time (20120105145123) in the content notification history table 241.

The SMS sending part 22 sends the SMS message having the body "PUSH=00001" to the destination (+819012341234) indicated by the content selecting part 24.

The SMS message sent from the SMS sending part 22 arrives at the SMS receiving part 15 through the telephone network 7, the packet-capable mobile communication base station 4 or the non-packet mobile communication base station 5 (whichever is selected based on the area in which the mobile terminal 1 is located, which is registered on the location registration server 8). The SMS receiving part 15 notifies the display controller 12 of the receipt of the SMS message.

The display controller 12 activates the SMS receiving operation 121 to receive the body of the incoming SMS message. Since the identifier "PUSH" is contained in the body, the display controller 12 determines that the incoming SMS message is a notification of a content ID and extracts the content ID "00001" from the body of the SMS message.

The display controller 12 asks the wireless LAN communication part 13 and the packet communication part 14 whether connection to the Internet 6 can be established or not. Since data roaming is disabled on the mobile terminal 1, the display controller 12 receives a reply indicating that the Internet connection cannot be established. Consequently, the SMS receiving operation 121 ends.

"Timer Event Activation"

A few minutes after the end of the SMS receiving operation 121 on the mobile terminal 1, a timer event occurs at the timer 26 in the delivery apparatus 2 and the timer event receiving operation 244 is activated in the content selecting part 24.

The content selecting part 24 acquires the current date and time (here, Jan. 5, 2012, Thursday, 14:57:02) from the clock 25 and searches the content notification history table 241 to retrieve an entry that is five minutes or more older than the current date and time. As a result, the content selecting part 24 acquires an entry having the notified party telephone number "819012341234", content ID "00001", and notification date and time "20120105145123" (see FIG. 3).

The content selecting part 24 searches the content management table 231 for the file name of the simplified-version of the content corresponding to the content ID "00001" and acquires the simplified-version file (here, 00001.txt) from the content server 23.

The content selecting part 24 instructs the SMS sending part 22 to send the body contained in the simplified-version file (00001.txt) acquired from the content server 23 to "819012341234". Before sending, an identifier (here CONT) indicating that the body is a simplified-version content is prepended to the body.

Since the body received from the content selecting part 24 exceeds the size that can be transmit in SMS, the SMS sending part 22 splits the body into a plurality of SMS messages and sends the SMS messages to the SMS receiving part 15 using a scheme commonly known as concatenated SMS through the telephone network 7 and the packet-capable mobile communication base station 4 or the non-packet mobile communication base station 5.

The SMS receiving part 15 receives and concatenates the split SMS messages together and, after the completion of the concatenation, sends an SMS receipt notification to the display controller 12. The display controller 12 receives the SMS receipt notification from the SMS receiving part 15 and acquires the body. Since the identifier (CONT) indicating a simplified-version content is prepended, the display controller 12 displays the received body on the display 11.

A second example in the first exemplary embodiment will be described next. The second example relates to information delivery to a data-roaming-enabled roaming-out terminal. In the second example described below, when the owner of a mobile terminal 1 that has a service agreement in Japan (country code "81") and a telephone number, 09012341234, has roamed out into Singapore (MCC "525") with the mobile terminal 1, information is delivered to the roaming-out terminal 1.

It is assumed here that an administrator of the delivery apparatus 2 has been registered the standard-version content and the simplified-version content illustrated in FIGS. 4 and 5 in the content server 23 beforehand and has set the delivery conditions including the delivery periods, days of weeks, time slots, visited domain MCCs and subscription country codes illustrated in FIG. 2.

It is also assumed that the mobile terminal 1 automatically sets a roaming destination network and data roaming is enabled on the mobile terminal 1. The timer event receiving operation 244 has been performed during activation of the delivery apparatus 2 and is subsequently performed at regular intervals (for example at intervals of five minutes).

"Location Registering Operation"

When the owner of the mobile terminal 1 having a service agreement in Japan (country code "81") and a telephone number, 09012341234, brings the mobile terminal 1 into Singapore (country code "65") and powers on the mobile terminal 1, the SMS receiving part 15 registers presence information in the visited-domain location registration server 8 through the non-packet mobile communication base station 5 or the packet-capable mobile communication base station 4. During the registration, the ID (MCC/MNC: for example 525-01) of the network where the mobile terminal 1 is located and the subscriber number (819012341234) are provided to the visited-domain location registration server 8 through a common channel signaling network.

The visited-domain location registration server 8 receives the presence information (location registration information) of the mobile terminal 1 from the packet-capable mobile communication base station 4 or the non-packet mobile communication base station 5 through the common channel signaling network (such as SS7).

Since in this instance the mobile phone carrier to which the mobile terminal 1 subscribes, which can be identified from the telephone number of the mobile terminal 1, is not the mobile phone carrier managing the visited-domain location registration server 8 (roaming-in as viewed from the carrier managing the visited-domain location registration server 8), the location information is registered in the home-domain location registration server 9 of the mobile terminal 1. The visited-domain location registration server 8 provides the telephone number (819012341234) of the mobile terminal 1 and the MCC (525) and MNC (01) of the network to which the visited-domain location registration server 8 belongs to the home-domain location registration server 9.

The home-domain location registration server 9 receives the presence information (location registration information) of the mobile terminal 1 from the visited-domain location registration server 8 through the common channel signaling network (such as SS7). In response to the registration of the presence information, the home-domain location registration server 9 detects that the subscriber to its service has roamed out into a network of Singapore. Then the home-domain location registration server 9 provides the MCC of the visited domain (525) and the subscriber number (819012341234) to the content selecting part 24.

When the content selecting part 24 receives the MCC (525) of the visited domain and the subscriber number (819012341234) from the location registration server 8, the content selecting part 24 searches the content management table 231 for a content that meets criteria by using the current date, day of the week and time, the MCC of the visited country, and the subscription country code as the keys. Here, the content selecting part 24 makes the search using the criteria, Jan. 5, 2012, Thursday (day-of-the-week code "4"), 14:51:23, visited domain MCC "525", and subscription country code "81" to obtain a content ID "00001" (see FIG. 2).

The content selecting part 24 sends an SMS message having a body including the content ID (00001) obtained as a result of searching the content management table 231 and an identifier (for example PUSH) indicating that the message is a push delivery SMS message to the subscriber number 819012341234 through the SMS sending part 22. The content selecting part 24 records the notified party telephone number (819012341234), the content ID (00001) and the notification date and time (20120105145123) in the content notification history table 241.

The SMS sending part 22 sends the SMS message having the body "PUSH=00001" to the destination (+819012341234) indicated by the content selecting part 24.

The SMS message sent from the SMS sending part 22 arrives at the SMS receiving part 15 through the telephone network 7, the packet-capable mobile communication base station 4 or the non-packet mobile communication base station 5 (whichever is selected based on the area in which the mobile terminal 1 is located, which is registered on the location registration server 8). The SMS receiving part 15 notifies the display controller 12 of the receipt of the SMS message.

The display controller 12 activates the SMS receiving operation 121 to receive the body of the incoming SMS message. Since the identifier "PUSH" is contained in the body, the display controller 12 determines that the incoming SMS message is a notification of a content ID and extracts the content ID "00001" from the body of the SMS message.

The display controller 12 asks the wireless LAN communication part 13 and the packet communication part 14 whether connection to the Internet 6 can be established or not. Since data roaming is enabled on the mobile terminal 1, the display controller 12 receives a reply indicating that the Internet connection can be established. Consequently, the display controller 12 presents the telephone number (819012341234) of the mobile terminal 1 and the content ID (00001) to the Web server 21 through the wireless LAN communication part 13 and the wireless LAN access point 3 or through the packet communication part 14 and the packet-capable mobile communication base station 4 to request a standard-version content.

The Web server 21 searches the content management table 231 for the standard-version file name of the content corresponding to the content ID "00001" presented in the request and acquires the standard-version file (here, 00001.htm) from the content server 23.

The Web server 21 sends the standard-version file (00001.htm) acquired from the content server 23 to the display controller 12 through the Internet 6. Furthermore, the Web server 21 sends a content acquisition notification including the telephone number (819012341234) and the content ID (00001) to the content selecting part 24.

The content selecting part 24 receives the content acquisition notification from the Web server 21, searches the content notification history table 241 and deletes the entry corresponding to the telephone number (819012341234) and the content ID (00001). This operation prevents the simplified version of the content from being sent using split SMS messages. When the display controller 12 receives the standard-version file (00001.htm) from the Web server 21, the display controller 12 displays the received body on the display 11.

While an identifier (for example PUSH or CONT) is used to indicate that an SMS message contains a content ID and contains a simplified-version content body in the foregoing description, the SMS sending part 22 of the delivery apparatus 2 may have two telephone numbers, one for sending a content ID and the other for sending a simplified-version content, and the SMS receiving part 15 may determine the type of an incoming SMS message on the basis of a caller telephone number notified through a calling number indication function.

While a visited domain is determined on the basis of MCC, the determination may be made on the basis of the combination of MCC and MNC. Alternatively, a country code may be used instead of MCC.

Alternatively, the latitudes and longitudes of the installation sites of a packet-capable mobile communication base stations 4 and non-packet mobile communication base stations 5 may be registered on the packet-capable mobile communication base stations 4 and the non-packet mobile communication base stations 5 and, when location information is registered, latitude and longitude information may be provided to the content selecting part 24 along with other information and the content selecting part 24 may determine a visited domain on the basis of the latitude and longitude information provided from the home-domain location registration server 9.

While an example has been described in the foregoing in which information is delivered to a mobile terminal 1 located in a visited area when the mobile terminal 1 has roamed out, information can be pushed to a mobile terminal that is not roaming (a terminal that is located in a home area) if latitude and longitude information is also provided to the content selecting part 24 when registering the location information.

According to the first exemplary embodiment, when a mobile terminal 1 is located in a region where a packet network is not available or when data roaming rejection is set on a mobile terminal 1, the mobile phone carrier to which the mobile terminal 1 subscribes (with which the mobile terminal 1 has a service agreement) or a service provider having an agreement with the mobile phone carrier can push information to the mobile terminal 1 located in the area of a visited network (that is, the roaming-out mobile terminal 1).

A second exemplary embodiment of the present invention will be described next. In the second exemplary embodiment, when a mobile terminal 1 is in an region where a packet network is not available or when data roaming rejection is set on a mobile terminal 1, a mobile phone carrier in the area to which the mobile terminal 1 is visiting (that is, a mobile phone carrier managing a visited-domain location registration server 8A) or a service provider that has an agreement with the mobile phone carrier pushes information to the mobile terminal 1 in the area of a network in the visited domain (that is, the roaming-in mobile terminal 1).

FIG. 10 is a block diagram of a push delivery system according to the second exemplary embodiment of the present invention. Referring to FIG. 10, the push delivery system according to the second exemplary embodiment of the present invention will be descried.

A visited-domain location registration server 8A is a device that manages presence information in a visited domain visited by a mobile terminal 1. The visited-domain location registration server 8A receives presence information (location registration information) of a mobile terminal 1 from a packet-capable mobile communication base station 4 or a non-packet mobile communication base station 5 through a common channel signaling network (such as SS7) and determines a base station to call upon arrival of an incoming voice call or other message.

If a mobile phone carrier to which the mobile terminal 1 subscribes is not the mobile phone carrier of the visited-domain location registration server 8A (in the case of roaming-in as viewed from the visited domain service provider), the visited-domain location registration server 8A registers the location information in a home-domain location registration server 9A and provides the telephone number of the roaming-out mobile terminal 1 and the MCC (Mobile Country Code) of the presence area (visited domain) to the content selecting part 24.

The home-domain location registration server 9A is a device that manages presence information concerning the mobile terminal 1. The home-domain location registration server 9A receives presence information (location registration information) concerning the mobile terminal 1 from the visited-domain location registration server 8A through a common channel signaling network (such as SS7) and determines a base station to call upon arrival of an incoming voice call or other message.

A push delivery method using this system will be described below in detail with reference to FIG. 10.

A first example in the second exemplary embodiment will be described first. The first example relates to information delivery to a roaming-in terminal on which data roaming rejection is set. In the first example described below, the owner of a mobile terminal 1 that has a telephone number, 0912123123, and a service agreement in Taiwan (country code "886") brings the mobile terminal 1 into Japan (MCC "440"), which action is a roaming-in viewed from the mobile phone carrier of a network in the area to which the mobile terminal 1 is visiting, and information is delivered to the roaming-in terminal 1.

It is assumed here that an administrator of the delivery apparatus 2 has been registered the standard-version content and the simplified-version content illustrated in FIGS. 4 and 5 in the content server 23 beforehand and has set the delivery conditions including the delivery periods, days of weeks, time slots, visited domain MCCs and subscription country codes illustrated in FIG. 2.

It is also assumed that the mobile terminal 1 automatically sets a roaming destination network but data roaming is disabled on the mobile terminal 1. The timer event receiving operation 244 has been performed on activation of the delivery apparatus 2 and is subsequently performed at regular intervals (for example at intervals of five minutes).

"Location Registering Operation"

When the owner of the mobile terminal 1 having a service agreement in Taiwan (country code "886") and a telephone number, 0912123123, brings the mobile terminal 1 into Japan (MCC "440") and powers on the mobile terminal 1, the SMS receiving part 15 registers presence information in the visited-domain location registration server 8A through the non-packet mobile communication base station 5 or the packet-capable mobile communication base station 4. During the registration, the ID (MCC/MNC: for example 440-10) of the network where the mobile terminal 1 is located and the subscriber number (886912123123) are provided to the visited-domain location registration server 8A through a common channel signaling network.

The visited-domain location registration server 8A receives presence information (location registration information) of the mobile terminal 1 from the packet-capable mobile communication base station 4 or the non-packet mobile communication base station base station 5 through the common channel signaling network (such as SS7). Since in this instance a mobile phone carrier to which the mobile terminal 1 subscribes, which can be identified from the telephone number of the mobile terminal 1, is not the mobile phone carrier managing the visited-domain location registration server 8A (roaming-in as viewed from the carrier managing the visited-domain location registration server 8A), the location information is registered in the home-domain location registration server 9A of the mobile terminal 1.

The visited-domain location registration server 8A provides the telephone number (886912123123) of the mobile terminal 1 and the MCC (440) and MNC (10) of the network to which the visited-domain location registration server 8A belongs to the home-domain location registration server 9A. In addition, the visited-domain location registration server 8A provides the MCC (440) of the visited domain and the subscriber number (886912123123) to the content selecting part 24.

When the content selecting part 24 receives the MCC (440) of the visited domain and the subscriber number (886912123123) from the location registration server 8A, the content selecting part 24 searches the content management table 231 for a content that meets criteria by using the current date, day of the week and time, the MCC of the visited country, and the subscription country code as the keys. Here, the content selecting part 24 makes the search using the criteria, Jan. 5, 2012, Thursday (day-of-the-week code "4"), 15:03:37, visited domain MCC "440", and subscription country code "886" to obtain a content ID "00003" (see FIG. 2).

The content selecting part 24 sends an SMS message having a body including the content ID (00003) obtained as a result of searching the content management table 231 and an identifier (for example PUSH) indicating that the message is a push delivery SMS message to the subscriber number "886912123123" through the SMS sending part 22. The content selecting part 24 records the notified party telephone number (886912123123), the content ID (00003) and the notification date and time (20120105150337) in the content notification history table 241.

The SMS sending part 22 sends the SMS message having the body "PUSH=00003" to the destination (+886912123123) indicated by the content selecting part 24.

The SMS message sent from the SMS sending part 22 arrives at the SMS receiving part 15 through the telephone network 7, the packet-capable mobile communication base station 4 or the non-packet mobile communication base station 5 (whichever is selected based on the area in which the mobile terminal 1 is located, which is registered on the location registration server 8A). The SMS receiving part 15 notifies the display controller 12 of the receipt of the SMS message.

The display controller 12 activates the SMS receiving operation 121 to receive the body of the incoming SMS message. Since the identifier "PUSH" is contained in the body, the display controller 12 determines that the incoming SMS message is a notification of a content ID and extracts the content ID "00003" from the body of the SMS message.

The display controller 12 asks the wireless LAN communication part 13 and the packet communication part 14 whether connection to the Internet 6 can be established or not. Since data roaming is disabled on the mobile terminal 1, the display controller 12 receives a reply indicating that the Internet connection cannot be established. Consequently, the SMS receiving operation 121 ends.

"Timer Event Activation"

A few minutes after the end of the SMS receiving operation 121 on the mobile terminal 1, a timer event occurs at the timer 26 in the delivery apparatus 2 and the timer event receiving operation 244 is activated in the content selecting part 24.

The content selecting part 24 acquires the current date and time (here, Jan. 5, 2012, Thursday, 15:10:02) from the clock 25 and searches the content notification history table 241 to retrieve an entry that is five minutes or more older than the current date and time. As a result, the content selecting part 24 acquires an entry having the notified party telephone number "86912123123", content ID "00003", and notification date and time "20120105150337" (see FIG. 3).

The content selecting part 24 searches the content management table 231 for the file name of the simplified-version of the content corresponding to the content ID "00003" and acquires the simplified-version file (here 00003.txt) from the content server 23.

The content selecting part 24 instructs the SMS sending part 22 to send the body contained in the simplified-version file (00003.txt) acquired from the content server 23 to "886912123123". Before sending, an identifier (here CONT) indicating that the body is a simplified-version content is prepended to the body.

Since the body received from the content selecting part 24 exceeds the size that can be sent and received by SMS, the SMS sending part 22 splits the body into a plurality of SMS messages and sends the SMS messages to the SMS receiving part 15 through the telephone network 7 and the packet-capable mobile communication base station 4 or the non-packet mobile communication base station 5 using a scheme commonly known as concatenated SMS.

The SMS receiving part 15 receives and concatenates the split SMS messages together and, after the completion of the concatenation, sends an SMS receipt notification to the display controller 12. The display controller 12 receives the SMS receipt notification from the SMS receiving part 15 and acquires the body. Since the identifier (CONT) indicating a simplified-version content is prepended, the display controller 12 displays the received body on the display 11.

A second example in the second exemplary embodiment will be described next. The second example relates to information delivery to a roaming-enabled roaming-in terminal. In the second example described below, when the owner of a mobile terminal 1 that has a service agreement in Taiwan (country code "886") and a telephone number, 0912123123, has roamed into Japan (MCC "440") with the mobile terminal 1, information is delivered to the roaming-in terminal 1.

It is assumed here that an administrator of the delivery apparatus 2 has been registered the standard-version content and the simplified-version content illustrated in FIGS. 4 and 5 in the content server 23 beforehand and has set the delivery conditions including the delivery periods, days of weeks, time slots, visited domain MCCs and subscription country codes illustrated in FIG. 2.

It is also assumed that the mobile terminal 1 automatically sets a roaming destination network and data roaming is enabled on the mobile terminal 1. The timer event receiving operation 244 has been performed on activation of the delivery apparatus 2 and is subsequently performed at regular intervals (for example at intervals of five minutes).

"Location Registering Operation"

When the owner of the mobile terminal 1 having a service agreement in Taiwan (country code "886") and a telephone number, 09121213123, brings the mobile terminal 1 into Japan (MCC "440") and powers on the mobile terminal 1, the SMS receiving part 15 registers presence information in the visited-domain location registration server 8A through the non-packet mobile communication base station 5 or the packet-capable mobile communication base station 4. During the registration, the ID (MCC/MNC: for example 440-10) of the network where the mobile terminal 1 is located and the subscriber number (886912123123) are provided to the visited-domain location registration server 8A through a common channel signaling network.

The visited-domain location registration server 8A receives the presence information (location registration information) of the mobile terminal 1 from the packet-capable mobile communication base station 4 or the non-packet mobile communication base station 5 through the common channel signaling network (such as SS7). Since in this instance the mobile phone carrier to which the mobile terminal 1 subscribes, which can be identified from the telephone number of the mobile terminal 1, is not the mobile phone carrier managing the visited-domain location registration server 8A (roaming-in as viewed from the carrier managing the visited-domain location registration server 8A), the location information is registered in the home-domain location registration server 9A of the mobile terminal 1. The visited-domain location registration server 8A provides the telephone number (886912123123) of the mobile terminal 1 and the MCC (440) and MNC (10) of the network to which the visited-domain location registration server 8A belongs to the home-domain location registration server 9A. In addition, the visited-domain location registration server 8A provides the MCC (440) of the visited domain and the subscriber number (886912123123) to the content selecting part 24.

When the content selecting part 24 receives the MCC (440) of the visited domain and the subscriber number (886912123123) from the location registration server 8A, the content selecting part 24 searches the content management table 231 for a content that meets criteria by using the current date, day of the week and time, the MCC of the visited country, and the subscription country code as the keys. Here, the content selecting part 24 makes the search using the criteria, Jan. 5, 2012, Thursday (day-of-the-week code "4"), 15:03:37, visited domain MCC "440", and subscription country code "886" to obtain a content ID "00003" (see FIG. 2).

The content selecting part 24 sends an SMS message having a body including the content ID (00003) obtained as a result of searching the content management table 231 and an identifier (for example PUSH) indicating that the message is a push delivery SMS message to the subscriber number "886912123123" through the SMS sending part 22. The content selecting part 24 records the notified party telephone number (8869121223123), the content ID (00003) and the notification date and time (20120105150337) in the content notification history table 241.

The SMS sending part 22 sends the SMS message having the body "PUSH=00003" to the destination (+886912123123) indicated by the content selecting part 24.

The SMS message sent from the SMS sending part 22 arrives at the SMS receiving part 15 through the telephone network 7, the packet-capable mobile communication base station 4 or the non-packet mobile communication base station 5 (whichever is selected based on the area in which the mobile terminal 1 is located, which is registered on the location registration server 8A). The SMS receiving part 15 notifies the display controller 12 of the receipt of the SMS message.

The display controller 12 activates the SMS receiving operation 121 to receive the body of the incoming SMS message. Since the identifier "PUSH" is contained in the body, the display controller 12 determines that the incoming SMS message is a notification of a content ID and extracts the content ID "00003" from the body of the SMS message.

The display controller 12 asks the wireless LAN communication part 13 and the packet communication part 14 whether connection to the Internet 6 can be established or not. Since data roaming is enabled on the mobile terminal 1, the display controller 12 receives a reply indicating that the Internet connection can be established. Consequently, the display controller 12 presents the telephone number (886912123123) of the mobile terminal 1 and the content ID (00003) to the Web server 21 through the wireless LAN communication part 13 and the wireless LAN access point 3 or through the packet communication part 14 and the packet-capable mobile communication base station 4 to request a standard-version content.

The Web server 21 searches the content management table 231 for the standard-version file name of the content corresponding to the content ID "00003" presented in the request and acquires the standard-version file (here, 00003.htm) from the content server 23.

The Web server 21 sends the standard-version file (00003.htm) acquired from the content server 23 to the display controller 12 through the Internet 6. Furthermore, the Web server 21 sends a content acquisition notification including the telephone number (886912123123) and the content ID (00003) to the content selecting part 24.

The content selecting part 24 receives the content acquisition notification from the Web server 21, searches the content notification history table 241 and deletes the entry corresponding to the telephone number (886912123123) and the content ID (00003). This operation prevents the simplified version of the content from being sent using split SMS messages. When the display controller 12 receives the standard-version file (00003.htm) from the Web server 21, the display controller 12 displays the received body on the display 11.

While an identifier (for example PUSH or CONT) is used to indicate that an SMS message contains a content ID and contains a simplified-version content body in the foregoing description, the SMS sending part 22 of the delivery apparatus 2 may have two telephone numbers, one for sending a content ID and the other for sending a simplified-version content, and the SMS receiving part 15 may determine the type of an incoming SMS message on the basis of a caller telephone number notified through a calling number indication function.

While a visited domain is determined on the basis of MCC, the determination may be made on the basis of the combination of MCC and MNC. Alternatively, a country code may be used instead of MCC.

Alternatively, the latitudes and longitudes of the installation sites of a packet-capable mobile communication base stations 4 and non-packet mobile communication base stations 5 may be registered on the packet-capable mobile communication base stations 4 and the non-packet mobile communication base stations 5 and, when location information is registered, latitude and longitude information may be provided to the content selecting part 24 along with other information and the content selecting part 24 may determine a visited domain on the basis of the latitude and longitude information provided from the home-domain location registration server 9A.

While an example has been described in the foregoing in which information is delivered to a mobile terminal 1 that has roamed in the visited area, information can be pushed to a mobile terminal that is not roaming (a mobile terminal that is located in the visited area and that subscribes to the mobile phone carrier managing the visited-domain location registration server 8A) if latitude and longitude information is also provided to the content selecting part 24 when registering the location information.

According to the second exemplary embodiment, when a mobile terminal 1 is located in an region where a packet network is not available or when data roaming rejection is set on a mobile terminal 1, the mobile phone carrier in the area to which the mobile terminal 1 is visiting or a service provider having an agreement with the mobile phone carrier can push information to the mobile terminal 1 located in the area of the network of the mobile phone carrier or the service provider (that is, the roaming-in mobile terminal).

A third exemplary embodiment of the present invention will be described next. In the third exemplary embodiment, when a mobile terminal 1 is in an region where a packet network is not available or data roaming rejection is set on the mobile terminal 1, a mobile phone carrier to which the mobile terminal 1 subscribes (or with which the mobile terminal 1 has a service agreement) or a service provider that has an agreement with the mobile phone carrier pushes information to the mobile terminal 1 in the area of a network in the visited domain (that is the roaming-out mobile terminal).

The third exemplary embodiment differs from the first exemplary embodiment in that when a content selecting part 24A detects a roaming out, a content selecting part 24A immediately sends a simplified-version content, rather than sending a content ID and waiting for a predetermined period of time to elapse before sending the simplified-version content.

Figure 11:
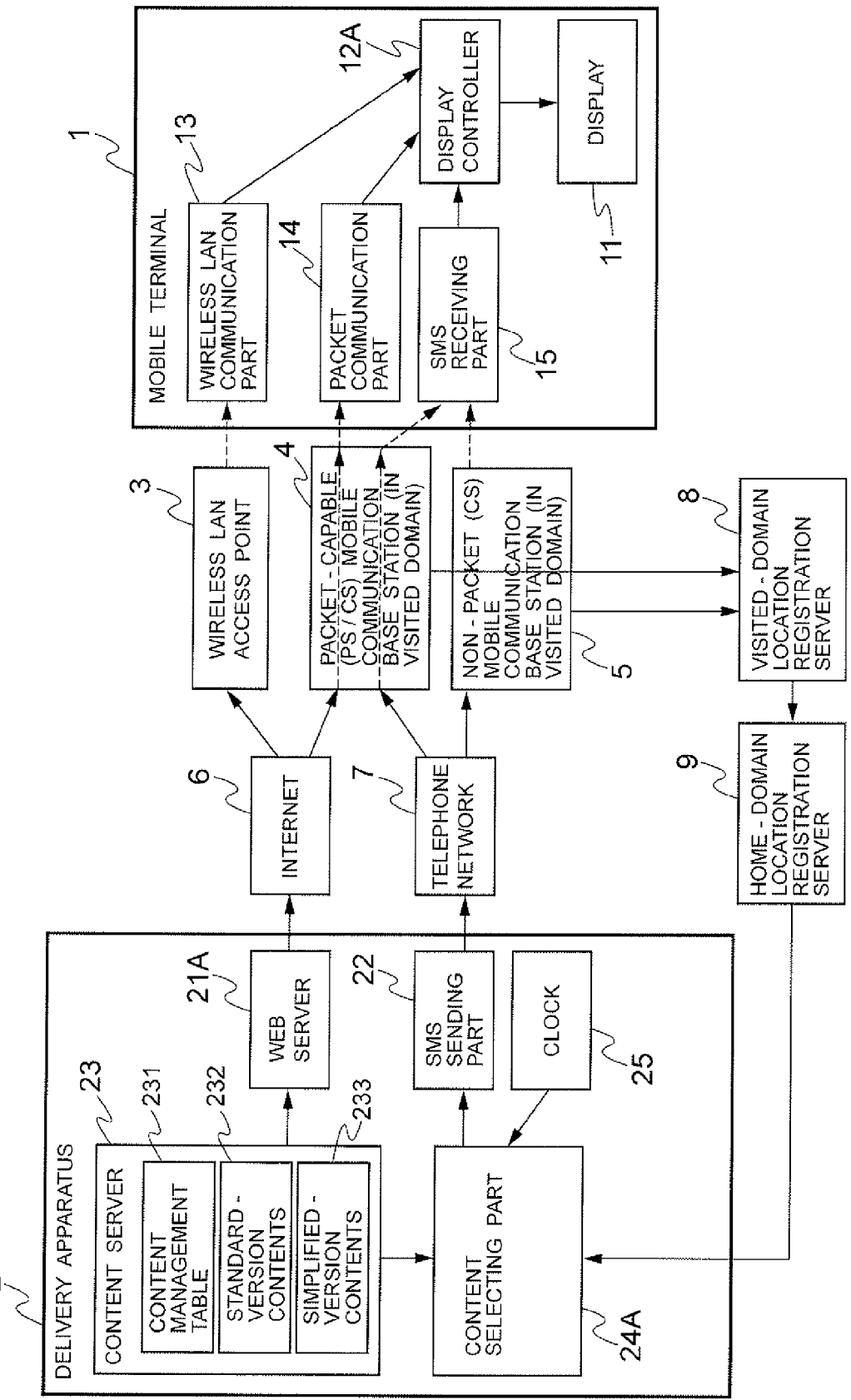
FIG. 11 is a block diagram of a push delivery system according to a third exemplary embodiment of the present invention.

FIG. 11 is a block diagram of a push delivery system according to the third exemplary embodiment of the present invention. Referring to FIG. 11, the push delivery system according to the third exemplary embodiment of the present invention will be described. The push delivery system according to the third exemplary embodiment differs from the push delivery system according to the first exemplary embodiment of the present invention in that the display controller 12 is replaced with a display controller 12A, the Web server 21 is replaced with a Web server 21A, the content selecting part 24 is replaced with a content selecting part 24A, and the timer 26 is omitted.

The display controller 12A receives a content ID from an SMS receiving part 15 and performs an SMS receiving operation 121A of receiving a standard-version content body from a wireless LAN communication part 13 or a packet communication part 14 and displaying the standard-version content body on a display 11, or displaying a simplified-version content which arrives from the SMS receiving part 15 on the display 11. Specifically, the display controller 12A is provided in the form of an application software to be installed on smartphones (multifunctional mobile phones) and tablet devices.

In response to a content acquisition request sent from a mobile terminal 1 through the Internet 6, the Web server 21A retrieves, from the content server 23, the content corresponding to a content ID presented in the request and sends the content to the mobile terminal 1 through the Internet 6.

The content selecting part 24A differs from the content selecting part 24 of the first exemplary embodiment in that the content selecting part 24A performs a roaming notification receiving operation 242A instead of the roaming notification receiving operation 242, does not have the content notification history table 241, and does not perform the content acquisition notification receiving operation 243 and the timer event receiving operation 244.

The roaming notification receiving operation 242A receives a roaming-in or roaming-out event from a control network, searches a content management table 231 in a content server 23 for a content that matches criteria, retrieves a simplified-version content corresponding to the content ID of the content found from the content server 23, and instructs an SMS sending part 22 to send the simplified-version content to the telephone number of a mobile terminal 1 provided from the control network. The size of the simplified-version content can exceed the maximum size allowed to be sent in SMS (70 to 140 characters or so). If so, the SMS sending part 22 splits the simplified-version content into multiple SMS messages and sends the SMS messages in what is known as concatenated SMS.

Figure 12:
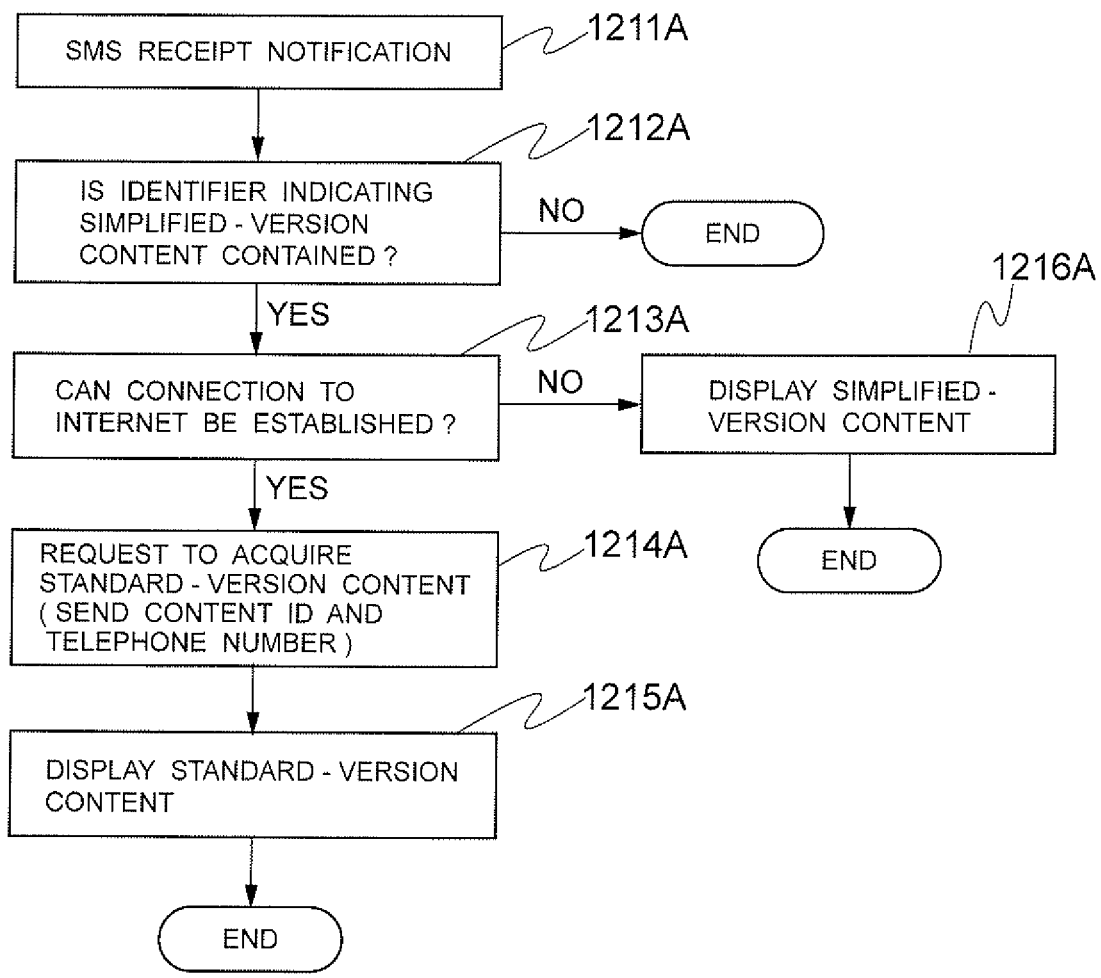
FIG. 12 is a flowchart illustrating an example of an SMS receiving operation 121A in a display controller 12A.

FIG. 12 is a flowchart illustrating an example of the SMS receiving operation 121A in the display controller 12A. Referring to FIG. 12, when the display controller 12A receives an SMS receipt notification from the SMS receiving part 15, the SMS receiving operation 121A is activated to acquire the body of an SMS message received and kept in the SMS receiving part 15 (step 1211A).

If the body acquired at step 1211A contains an identifier (for example CONT) indicating a simplified-version content, the operation proceeds to step 1213A. If the body does not contain the identifier (for example CONT) indicating a simplified-version content, the SMS receiving operation 121A ends (step 1212A).

If the identifier indicating a simplified-version content is detected at step 1212A, the display controller 12A asks the wireless LAN communication part 13 and the packet communication part 14 whether or not a connection to the Internet 6 can be established. If the wireless LAN communication part 13 and/or the packet communication part 14 can connect to the Internet 6 (that is, communication with the Web server 21A is possible), the operation proceeds to step 1214A. If neither of the wireless LAN communication part 13 and the packet communication part 14 can connect to the Internet 6 (that is, communication with the Web server 21A is impossible), the operation proceeds to step 1216A (step 1213A).

If it is determined at step 1213A that connection to the Internet 6 can be established, the content ID acquired at step 1212 and the telephone number of the mobile terminal 1 are sent to the Web server 21A through the wireless LAN communication part 13 or the packet communication part 14 over the Internet 6 to acquire a standard-version content 232 corresponding to the content ID over the Internet 6 (step 1214A).

The standard-version content acquired at step 1214A is displayed on the display 11 (step 1215A). If it is determined at step 1213A that a connection to the Internet 6 cannot be established, the simplified-version content acquired at step 1212A is displayed on the display 11 (step 1216A).

Figure 13:
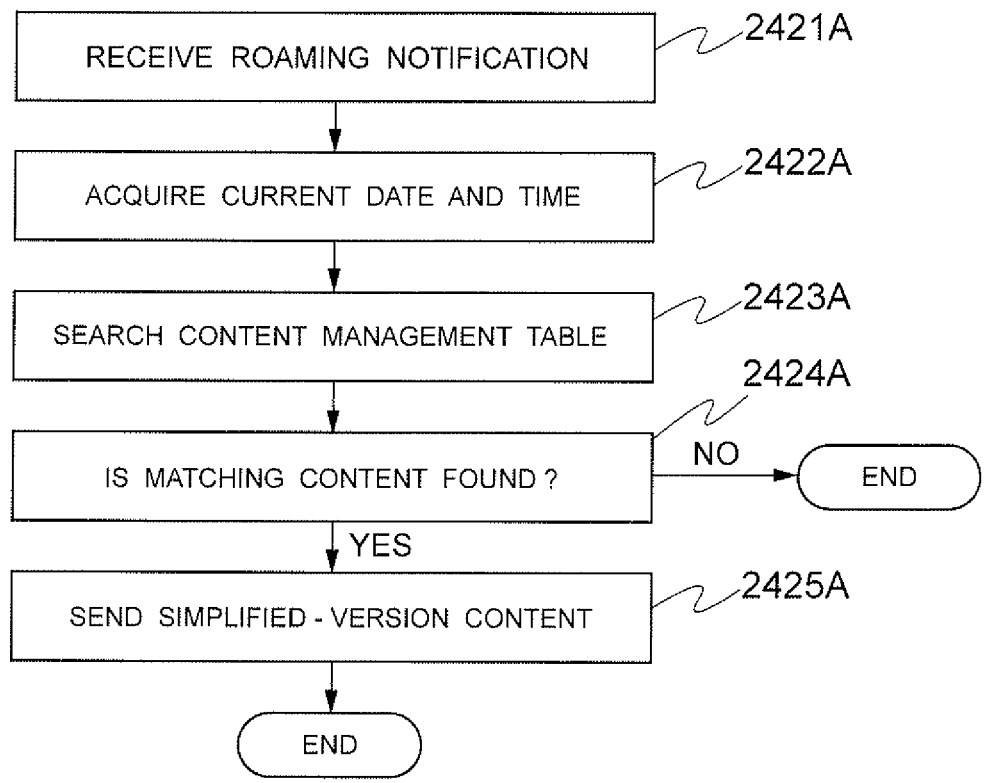
FIG. 13 is a flowchart illustrating an example of a roaming notification receiving operation 242A in a content selecting part 24A.

FIG. 13 is a flowchart illustrating an example of the roaming notification receiving operation 242A in the content selecting part 24A. When the content selecting part 24A receives a roaming notification containing the telephone number of a mobile terminal 1 that has roamed out and the MCC of a presence area (visited domain) from the home-domain location registration server 9, the roaming notification receiving operation 242A is activated (step 2421A).

The content selecting part 24A acquires the current year, month, day, hour, minute and second from the clock 25 (step 2422A). The content selecting part 24A searches the content management table 231 using the country code of the subscription country which can be determined from the telephone number of the mobile terminal 1 received at step 2421A, the MCC of the visited domain received at step 2421A, the current date, time and day of the week acquired at step 2422A as criteria to retrieve the ID of a content that meets the criteria (step 2423A).

If one or more contents that meet the criteria are found at step 2423A, the operation proceeds to step 2425A. If no content that meets the criteria is found, the roaming notification receiving operation 242A ends (step 2424A).

A simplified-version of the content that matches the criteria at step 2423A is acquired from the content server 23 and the simplified-version content is sent to the telephone number of the mobile terminal 1, which is received from the home-domain location registration server 9 through the control network, through the SMS sending part 22 (step 2425A).

A push delivery method using this system will be described below in detail with reference to FIG. 11.

A first example in the third exemplary embodiment will be described first. The first example relates to delivery of information to a roaming-out terminal 1 on which data roaming rejection is set. In the first example, the owner of a mobile terminal 1 that has a service agreement in Japan (country code "81") and a telephone number, 09012341234, has roamed out into Singapore (MCC "525"), information is delivered to the roaming-out terminal 1.

It is assumed here that an administrator of the delivery apparatus 2 has been registered the standard-version content and the simplified-version content illustrated in FIGS. 4 and 5 in the content server 23 beforehand and has set the delivery conditions including the delivery periods, days of weeks, time slots, visited domain MCCs and subscription country codes illustrated in FIG. 2. It is also assumed that the mobile terminal 1 automatically sets a roaming destination network but data roaming is disabled on the mobile terminal 1.

"Location Registering Operation"

When the owner of the mobile terminal 1 having a service agreement in Japan (country code "81") and a telephone number, 09012341234, brings the mobile terminal 1 into Singapore (MCC "525") and powers on the mobile terminal 1, the SMS receiving part 15 registers presence information in the visited-domain location registration server 8 through the non-packet mobile communication base station 5 or the packet-capable mobile communication base station 4. During the registration, the ID (MCC/MNC: for example 525-01) of the network where the mobile terminal 1 is located and the subscriber number (819012341234) are provided to the visited-domain location registration server 8 through a common channel signaling network.

The visited-domain location registration server 8 receives the presence information (location registration information) of the mobile terminal 1 from the packet-capable mobile communication base station 4 or the non-packet mobile communication base station 5 through the common channel signaling network (such as SS7). Since in this instance the mobile phone carrier to which the mobile terminal 1 subscribes, which can be identified from the telephone number of the mobile terminal 1, is not the mobile phone carrier managing the visited-domain location registration server 8 (roaming-in as viewed from the carrier managing the visited-domain location registration server 8), the location information is registered in the home-domain location registration server 9 of the mobile terminal 1. The visited-domain location registration server 8 provides the telephone number (819012341234) of the mobile terminal 1 and the MCC (525) and MNC (01) of the network to which the visited-domain location registration server 8 belongs to the home-domain location registration server 9.

The home-domain location registration server 9 receives the presence information (location registration information) of the mobile terminal 1 from the visited-domain location registration server 8 through the common channel signaling network (such as SS7). In response to the registration of the presence information, the home-domain location registration server 9 detects that the subscriber to its service has roamed out into a network of Singapore. Then the home-domain location registration server 9 provides the MCC (525) of the visited domain and the subscriber number (819012341234) to the content selecting part 24A.

When the content selecting part 24A receives the MCC (525) of the visited domain and the subscriber number (819012341234) from the location registration server 9, the content selecting part 24A searches the content management table 231 for a content that meets criteria by using the current date, day of the week and time, the MCC of the visited country, and the subscription country code as the keys. Here, the content selecting part 24A makes the search using the criteria, Jan. 5, 2012, Thursday (day-of-the-week code "4"), 14:51:23, visited domain MCC "525", and subscription country code "81" to obtain a content ID "00001" (see FIG. 2).

The content selecting part 24A searches the content management table 231 for the file name of the simplified version content corresponding to the content ID (00001) obtained as a result of searching the content management table 231 and acquires the simplified-version file (00001.txt) from the content server 23.

The content selecting part 24 instructs the SMS sending part 22 to send the body text contained in the simplified-version file (00001.txt) acquired from the content server 23 to "819012341234". Before sending, an identifier indicating that it is a simplified-version content and the content ID (here, CONT=00001) are prepended to the body text.

Since the body text received from the content selecting part 24A exceeds the size that can be sent in SMS, the SMS sending part 22 splits the body text into a plurality of SMS messages and sends the SMS messages to the SMS receiving part 15 using a scheme commonly known as concatenated SMS through the telephone network 7 and the packet-capable mobile communication base station 4 or the non-packet mobile communication base station 5. The SMS receiving parts 15 receives and concatenate the split SMS messages together and after the completion of the concatenation, sends an SMS receipt notification to the display controller 12A.

The display controller 12A receives the SMS receipt notification from the SMS receiving part 15 and obtains the body text. Since the identifier indicating a simplified-version content and the content ID (CONT=00001) are prepended to the body text, the display controller 12A determines that the incoming SMS message is a simplified-version content. The display controller 12A extracts the content ID "00001" from the SMS body text.

The display controller 12A asks the wireless LAN communication part 13 and the packet communication part 14 whether connection to the Internet 6 can be established or not. Since data roaming is disabled on the mobile terminal 1, the display controller 12A receives a reply indicating that the Internet connection cannot be established. Consequently, the display controller 12A displays the received simplified-version content on the display 11.

A second example in the third exemplary embodiment will be described next. The second example relates to information delivery to a data-roaming-enabled roaming-out terminal. In the second example described below, when the owner of a mobile terminal 1 that has a service agreement in Japan (country code "81") and a telephone number, 09012341234, has roamed out into Singapore (MCC "525") with the mobile terminal 1, information is delivered to the roaming-out terminal 1.

It is assumed here that an administrator of the delivery apparatus 2 has been registered the standard-version content and the simplified-version content illustrated in FIGS. 4 and 5 in the content server 23 beforehand and has set the delivery conditions including the delivery periods, days of weeks, time slots, visited domain MCCs and subscription country codes illustrated in FIG. 2. It is also assumed that the mobile terminal 1 automatically sets a roaming destination network and data roaming is enabled on the mobile terminal 1.

"Location Registering Operation"

When the owner of the mobile terminal 1 having a service agreement in Japan (country code "81") and a telephone number, 09012341234, brings the mobile terminal 1 into Singapore (MCC "525") and powers on the mobile terminal 1, the SMS receiving part 15 registers presence information in the visited-domain location registration server 8 through the non-packet mobile communication base station 5 or the packet-capable mobile communication base station 4. During the registration, the ID (MCC/MNC: for example 525-01) of the network where the mobile terminal 1 is located and the subscriber number (819012341234) are provided to the visited-domain location registration server 8 through a common channel signaling network.

The visited-domain location registration server 8 receives the presence information (location registration information) of the mobile terminal 1 from the packet-capable mobile communication base station 4 or the non-packet mobile communication base station 5 through the common channel signaling network (such as SS7). Since in this instance the mobile phone carrier to which the mobile terminal 1 subscribes, which can be identified from the telephone number of the mobile terminal 1, is not the mobile phone carrier managing the visited-domain location registration server 8 (roaming-in as viewed from the carrier managing the visited-domain location registration server 8), the location information is registered in the home-domain location registration server 9 of the mobile terminal 1. The visited-domain location registration server 8 provides the telephone number (819012341234) of the mobile terminal 1 and the MCC (525) and MNC (01) of the network to which the visited-domain location registration server 8 belongs to the home-domain location registration server 9.

The home-domain location registration server 9 receives the presence information (location registration information) of the mobile terminal 1 from the visited-domain location registration server 8 through the common channel signaling network (such as SS7). In response to the registration of the presence information, the home-domain location registration server 9 detects that the subscriber to its service has roamed out into a network of Singapore. Then the home-domain location registration server 9 provides the MCC (525) of the visited domain and the subscriber number (819012341234) to the content selecting part 24A.

When the content selecting part 24A receives the MCC (525) of the visited domain and the subscriber number (819012341234) from the location registration server 8, the content selecting part 24A searches the content management table 231 for a content that meets criteria by using the current date, day of the week and time, the MCC of the visited country, and the subscription country code as the keys. Here, the content selecting part 24A makes the search using the criteria, Jan. 5, 2012, Thursday (day-of-the-week code "4"), 14:51:23, visited domain MCC "525", and subscription country code "81" to obtain a content ID "00001" (see FIG. 2).

The content selecting part 24A searches the content management table 231 for the file name of the simplified version content corresponding to the content ID (00001) obtained as a result of searching the content management table 231 and acquires the simplified-version file (00001.txt) from the content server 23.

The content selecting part 24A instructs the SMS sending part 22 to send the body text contained in the simplified-version file (00001.txt) acquired from the content server 23 to "819012341234". Before sending, an identifier indicating that it is a simplified-version content and the content ID (here, CONT=00001) are prepended to the body text.

Since the body text received from the content selecting part 24A exceeds the size that can be sent in SMS, the SMS sending part 22 splits the body text into a plurality of SMS messages and sends the SMS messages to the SMS receiving part 15 using a scheme commonly known as concatenated SMS through the telephone network 7 and the packet-capable mobile communication base station 4 or the non-packet mobile communication base station 5.

The SMS receiving parts 15 receives and concatenate the split SMS messages together and after the completion of the concatenation, sends an SMS receipt notification to the display controller 12A.

The display controller 12A receives the SMS receipt notification from the SMS receiving part 15 and obtains the body text. Since the identifier indicating a simplified-version content and the content ID (CONT=00001) are prepended to the body text, the display controller 12A determines that the incoming SMS message is a simplified-version content. The display controller 12A extracts the content ID "00001" from the SMS body text.

The display controller 12A asks the wireless LAN communication part 13 and the packet communication part 14 whether connection to the Internet 6 can be established or not. Since data roaming is enabled on the mobile terminal 1, the display controller 12A receives a reply indicating that the Internet connection can be established. Consequently, the display controller 12A presents the content ID (00001) to the Web server 21A through the wireless LAN communication part 13 and the wireless LAN access point 3 or through the packet communication part 14 and the packet-capable mobile communication base station 4 to request a standard-version content.

The Web server 21A searches the content management table 231 for the standard-version file name of the content corresponding to the content ID "00001" presented in the request and acquires the standard-version file (00001.htm) from the content server 23.

The Web server 21A sends the standard-version file (00001.htm) acquired from the content server 23 to the display controller 12A through the Internet 6. When the display controller 12A receives the standard-version file (00001.htm) from the Web server 21A, the display controller 12A displays the received body on the display 11.

While an identifier (for example PUSH or CONT) is used to indicate that an SMS message contains a content ID and contains a simplified-version content body in the foregoing description, the SMS sending part 22 of the delivery apparatus 2 may have two telephone numbers, one for sending a content ID and the other for sending a simplified-version content, and the SMS receiving part 15 may determine the type of an incoming SMS message on the basis of a caller telephone number notified through a calling number indication function.

While a visited domain is determined on the basis of MCC, the determination may be made on the basis of the combination of MCC and MNC. Alternatively, a country code may be used instead of MCC.

Alternatively, the latitudes and longitudes of the installation sites of a packet-capable mobile communication base stations 4 and non-packet mobile communication base stations 5 may be registered on the packet-capable mobile communication base stations 4 and the non-packet mobile communication base stations 5 and, when location information is registered, latitude and longitude information may be provided to the content selecting part 24A along with other information and the content selecting part 24A may determine a visited domain on the basis of the latitude and longitude information provided from the home-domain location registration server 9.

While an example has been described in the foregoing in which information is delivered to a mobile terminal 1 located in a visited area when the mobile terminal 1 has roamed out, information can be pushed to a mobile terminal that is not roaming (a terminal that is located in a home area) if latitude and longitude information is also provided to the content selecting part 24A when registering the location information.

According to the third exemplary embodiment, when a mobile terminal 1 is located in an region where a packet network is not available or when data roaming rejection is set on a mobile terminal 1, the mobile phone carrier to which the mobile terminal 1 subscribes (with which the mobile terminal 1 has a service agreement) or a service provider having an agreement with the mobile phone carrier can push information to the mobile terminal 1 located in the area of a visited network (that is, the roaming-out mobile terminal).

A fourth exemplary embodiment of the present invention will be described next. In the fourth exemplary embodiment, when a mobile terminal 1 is in an region where a packet network is not available or data roaming rejection is set on the mobile terminal 1, a mobile phone carrier to which the mobile terminal 1 subscribes (or with which the mobile terminal 1 has a service agreement) or a service provider that has an agreement with the mobile phone carrier pushes information to the mobile terminal 1 in the area of a network in the visited domain (that is the roaming-out mobile terminal).

The fourth exemplary embodiment differs from the first exemplary embodiment in that a mobile terminal 1 acquires all of standard-version contents from a content server 23B and stores the standard-version contents in a content storing part 16 beforehand and, when receiving a content ID from a content selecting part 24B, selects and displays the standard-version content that corresponds to the received content ID from among the stored contents.

Figure 14:
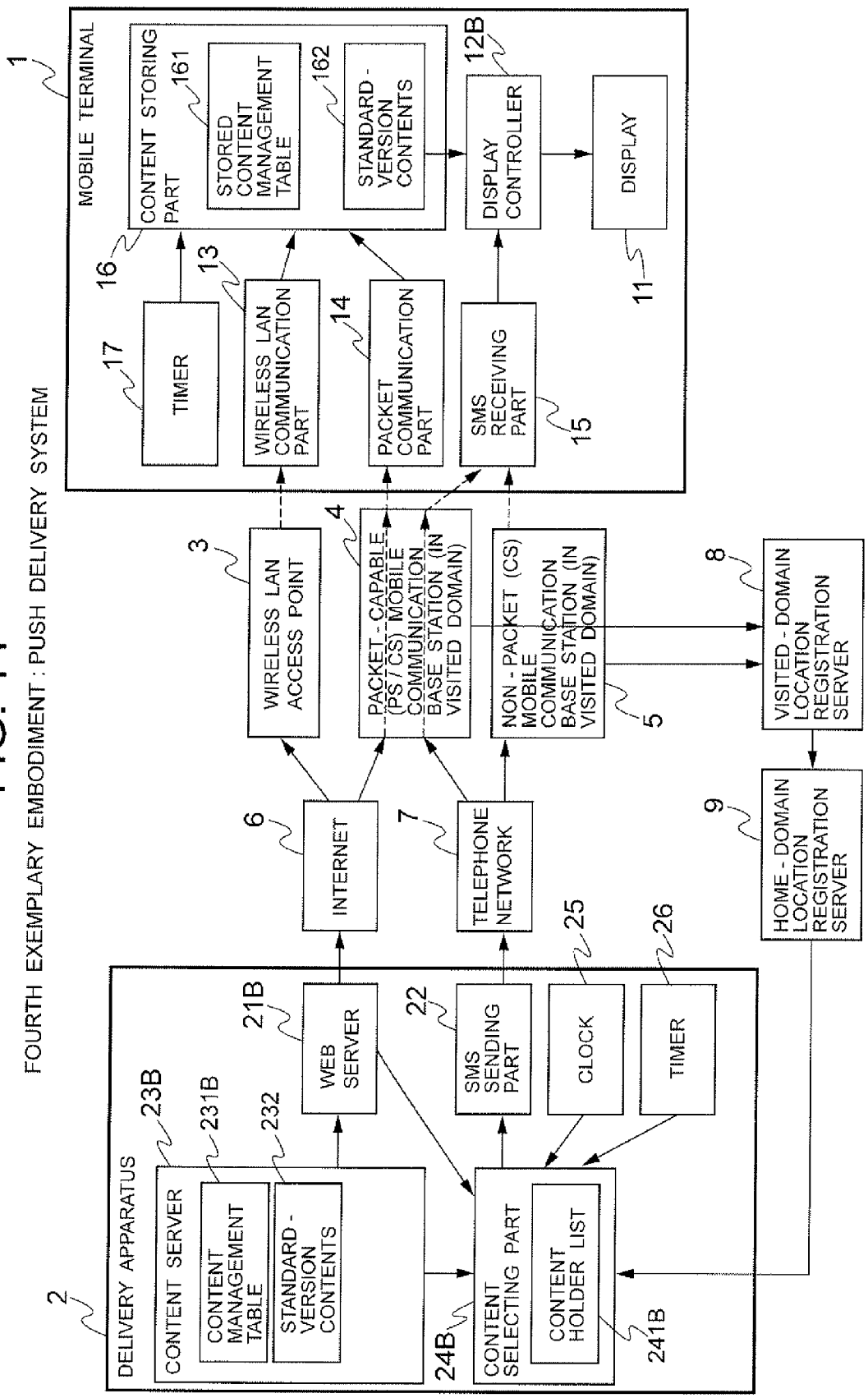
FIG. 14 is a block diagram of a push delivery system according to a fourth exemplary embodiment of the present invention.

FIG. 14 is a block diagram of a push delivery system according to the fourth exemplary embodiment of the present invention. The push delivery system according to the fourth exemplary embodiment of the present invention will be described with reference to FIG. 14. The push delivery system according to the fourth exemplary embodiment differs from the push delivery system according to the first exemplary embodiment of the present invention in that the display controller 12 is replaced with a display controller 12B, a content storing part 16 and a timer 17 are added, the Web server 21 is replaced with a Web server 21B, the content server 23 is replaced with a content server 23B, and the content selecting part 24 is replaced with the content selecting part 24B.

The display controller 12B receives a content ID from an SMS receiving part 15 and performs an SMS receiving operation 121B of searching a stored content management table 161 in the content storing part 16 for a standard-version content corresponding to the content ID and displaying the standard-version content on a display 11. Specifically, the display controller 12B is provided in the form of an application software to be installed on smartphones (multifunctional mobile phones) or tablet devices. The content storing part 16 and the display controller 12B may be provided as one application software.

The content storing part 16 includes a stored content management table 161 and standard-version contents 162 and performs a content storing operation 163. Specifically, the content storing part 16 is provided in the form of an application software to be installed on smartphones (multifunctional mobile phones) or tablet devices. The content storing part 16 and the display controller 12B may be provided as one application software.

The stored content management table 161 is a table listing standard-version contents stored. The standard-version contents 162 are contents corresponding to standard-version contents 232 stored on the content server 23B.

The content storing operation 163 is performed every time a timer event is received from the timer 17. The operation requests the Web server 21B in the delivery apparatus 2 to provide all of the standard-version contents 232 kept in the content server 23B, stores the standard-version contents 232 and records the IDs and file names of the stored contents in the stored content management table 161.

The timer 17 is a timer similar to the timer 26 in the first exemplary embodiment. In response to a content acquisition request sent from a mobile terminal 1 through the Internet 6, the Web server 21B retrieves the content corresponding to a content ID presented in the request from the content server 23B and sends the content to the mobile terminal 1 through the Internet 6. When the Web server 21B receives the content acquisition request from the mobile terminal 1 through the Internet 6, the Web server 21B sends a content acquisition notification including the telephone number of the mobile terminal 1 to the content selecting part 24B.

The content server 23B differs from the content server 23 of the first exemplary embodiment in that the content server 23B includes a content management table 231B instead of the content management table 231 and does not include the simplified-version contents 233.

The content selecting part 24B differs from the content selecting part 24 of the first exemplary embodiment in that the content selecting part 24B includes a content holder list 241B instead of the content notification history table 241, performs a roaming notification receiving operation 242B instead of the roaming notification receiving operation 242, performs a content acquisition notification receiving operation 243B instead of the content acquisition notification receiving operation 243, and performs a timer event receiving operation 244B instead of the timer event receiving operation 244. The content holder list 241B is a table recording the telephone numbers of mobile terminals 1 that store contents and the last download dates and times.

The roaming notification receiving operation 242B receives a roaming-in or roaming-out event from a control network, searches the content holder list 241B by using a telephone number provided from the control network as a key and, if the mobile terminal 1 that has the telephone number holds a content, searches the content management table 231B in the content server 23B for a content that matches criteria, and instructs the SMS sending part 22 to send the content ID of the content found to the telephone number of the mobile terminal 1 provided from the control network.

The content acquisition notification receiving operation 243B records the telephone number of a mobile terminal 1 that has downloaded a content and the last download date and time in the content holder list 241B when a content acquisition notification is received from the Web server 21B.

When a timer event is received from the timer 26, the timer event receiving operation 244B checks the content holder list 241B and deletes an entry that has been on the list for more than or equal to a predetermined period of time (for example one month) since the last download date and time.

FIG. 15 is a diagram illustrating an example of the stored content management table 161 which is recorded in the content storing part 16 and lists the contents stored in the content storing part 16. The stored content management table 161 includes a content ID 1611 and a standard-version file 1612.

The content ID 1611 is an ID uniquely identifying a content kept in the content storing part 16. The standard-version file 1612 is a field for recording the file name of a content delivered through the Internet 6 and stored.

FIG. 16 is a diagram illustrating an example of the content management table 231B which is recorded in the content server 23B and lists contents kept in the content server 23B. Unlike the content management table 231 of the first exemplary embodiment, the content management table 231B does not contain a simplified-version file 2318.

Figures 17, 18:
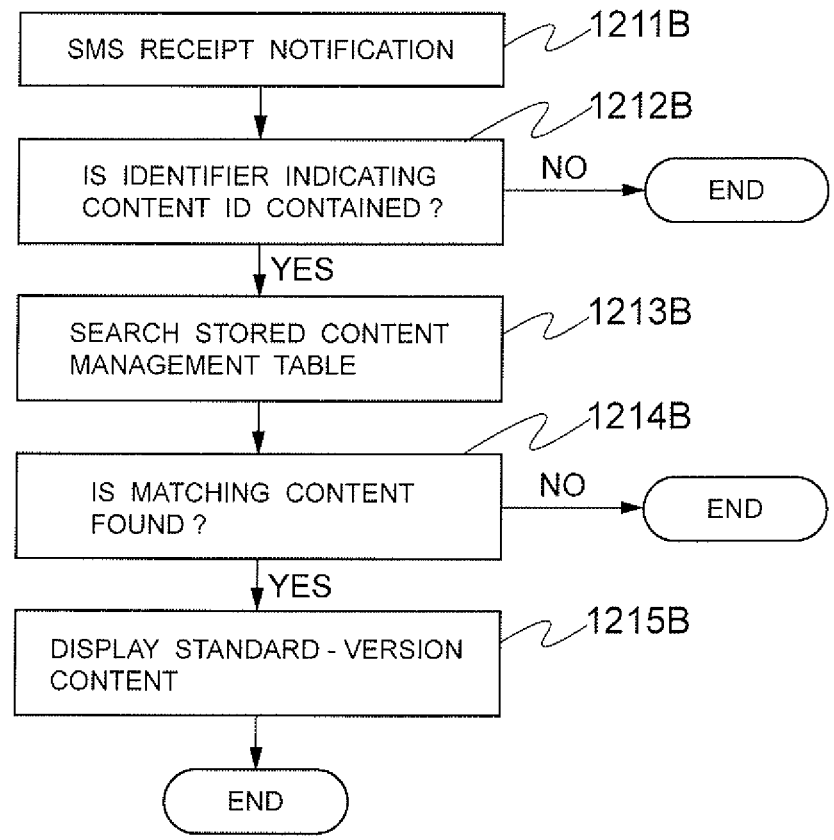
FIG. 17 is a diagram illustrating a content holder list 241B, which is recorded in the content selecting part 24, for recording the telephone numbers of mobile terminals 1 that have downloaded and stored contents through the Internet 6 and the last download dates and times.
FIG. 18 is a flowchart illustrating an example of an SMS receiving operation 121B in a display controller 12B.

FIG. 17 is a diagram illustrating an example of the content holder list 241B which is recorded in the content selecting part 24B and records the telephone number of a mobile terminal 1 that has already downloaded and stored a content through the Internet 6 and the last download date and time. The content holder list 241B includes a content holder 2411B and a last download date and time 2412B.

The content holder 2411B is a field for recording the telephone number of a mobile terminal 1 that has already downloaded and stored a content through the Internet 6. The last download date and time 2412B is a field for recording the last download date and time.

FIG. 18 is a flowchart illustrating an example of the SMS receiving operation 121B in the display controller 12B. When the display controller 12B receives an SMS receipt notification from the SMS receiving part 15, the SMS receiving operation 121B is activated and the display controller 12B acquires the body of the SMS message received and stored in the SMS receiving part 15 (step 1211B).

If the body acquired at step 1211B contains an identifier (for example PUSH) indicating a content ID, the operation proceeds to step 1213B. If the body does not contain the identifier (for example PUSH) indicating a content ID, the SMS receiving operation 121B ends (step 1212B).

The display controller 12B searches the stored content management table 161 using the content ID acquired at step 1212B as a key (step 1213B). If the search finds a stored standard-version content corresponding to the content ID, the operation proceeds to step 1215B. If a standard-version content corresponding to the content ID is not stored, the SMS receiving operation 121B ends (step 1214B). The display controller 12B acquires the found standard-version content from the content storing part 16 and displays the standard-version content on the display 11 (step 1215B).

Figure 19:
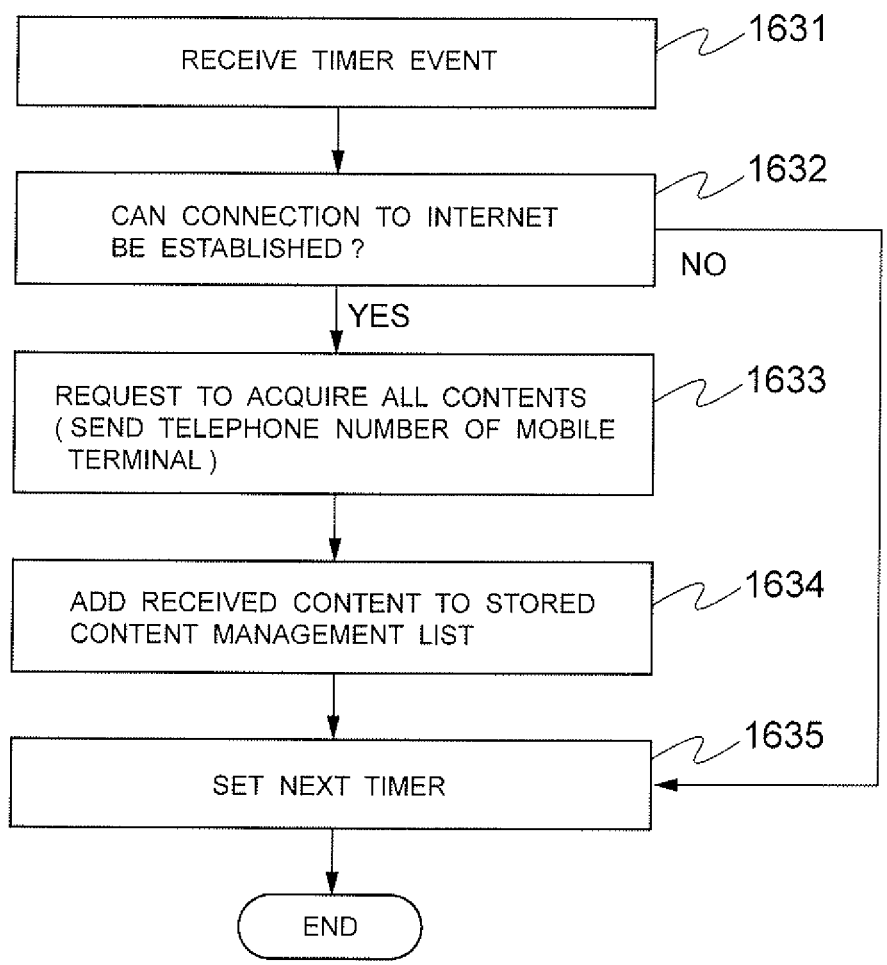
FIG. 19 is a flowchart illustrating an example of a content storing operation 163 in the content storing part 16.

FIG. 19 is a flowchart illustrating an example of the content storing operation 163 in the content storing part 16. When the content storing part 16 receives a timer event from the timer 17, the content storing part 16 activates the content storing operation 163 (step 1631).

The content storing part 16 asks the wireless LAN communication part 13 and the packet communication part 14 whether a connection to the Internet 6 can be established or not. If the wireless LAN communication part 13 and/or the packet communication part 14 can connect to the Internet 6 (that is, the wireless LAN communication part 13 and/or the packet communication part 14 can communicate with the Web server 21B), the operation proceeds to step 1633. If neither of the wireless LAN communication part 13 and the packet communication part 14 can connect to the Internet 6 (that is, neither of them can communicate with the Web server 21B), the operation proceed to step 1635 (step 1632).

It is determined at step 1632 that a connection to the Internet 6 can be established, the content storing part 16 sends the telephone number of the mobile terminal 1 to the Web server 21B through the wireless LAN communication part 13 or the packet communication part 14 over the Internet 6 and downloads all of the standard-version contents 232 at once over the Internet 6 (step 1633).

The content storing part 16 records the content IDs and file names of the standard-version contents 232 downloaded at once at step 1632 in the stored content management table 161 (step 1634).

The timer 17 is set so as to activate the content storing operation 163 again after a predetermined period of time (for example one month) has elapsed, and then the content storing operation 163 ends (step 1635).

Figure 20:
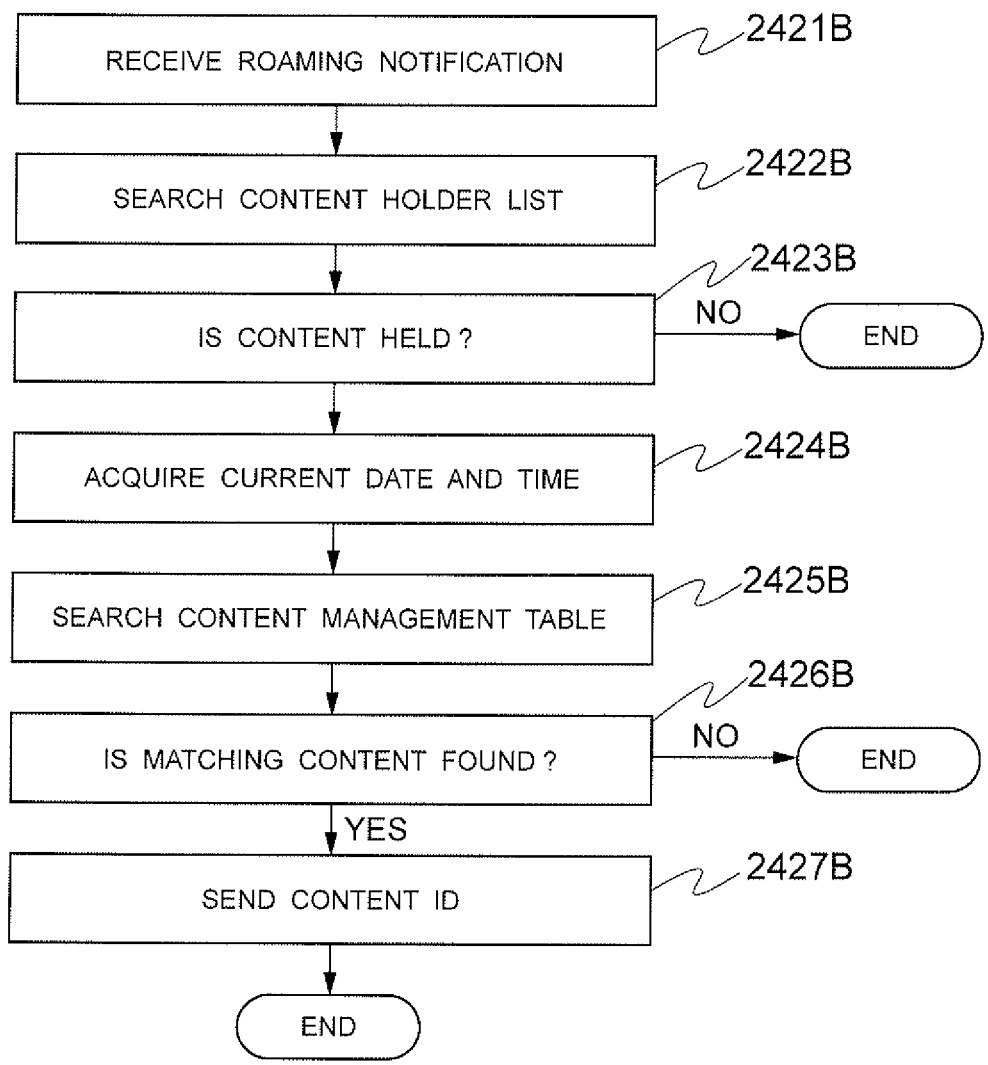
FIG. 20 is a flowchart illustrating an example of a roaming notification receiving operation 242B in a content selecting part 24B.

FIG. 20 is a flowchart illustrating an example of the roaming notification receiving operation 242B in the content selecting part 24B. When the content selecting part 24B receives a roaming notification including the telephone number of a mobile terminal 1 that has roamed out and the MCC of the presence area (visited domain) of the mobile terminal 1 from the home-domain location registration server 9, the roaming notification receiving operation 242B is activated (step 2421B).

The content selecting part 24B searches the content holder list 241B by using the telephone number of the mobile terminal 1 received from the home-domain location registration server 9 as a key (step 2422B).

If the search shows that the mobile terminal 1 received from the home-domain location registration server 9 holds a content, the operation proceeds to step 2424B. If the mobile terminal 1 does not hold a content, the roaming notification receiving operation 242B ends. The content selecting part 24B acquires the current year, month, day, hour, minute and second from the clock 25 (step 2424B).

The content selecting part 24B searches the content management table 231B by using the country code of the country where the mobile terminal 1 has a subscription which can be identified from the telephone number of the mobile terminal 1 received at step 2421B, the MCC of the visited domain received at step 2421B, and the current date, time and day of the week acquired at step 2424B as keys to acquire the ID of a content that meets the criteria (step 2425B).

If one or more contents that meet the criteria are found at step 2425B, the operation proceeds to step 2427B. If no content that meets the criteria is found, the roaming notification receiving operation 242B ends (step 2426B).

The content selecting part 24B sends the ID of the content that meets the criteria at step 2426B to the telephone number of the mobile terminal 1 received from the control network at step 2421B, through the SMS sending part 22 (step 2427B).

FIG. 21 is a flowchart illustrating an example of the content acquisition notification receiving operation 243B in the content selecting part 24B. When the content selecting part 24B receives a content acquisition notification including the telephone number of a mobile terminal that has downloaded the standard-version contents from the Web server 21B, the content selecting part 24B activates the content acquisition notification receiving operation 243B (step 2431B).

The content selecting part 24B acquires the current year, month, day, hour, minute and second from the clock 25 (step 2432B). The content selecting part 24B then records the telephone number received at step 2431B and the current year, month, day, hour, minute and second acquired at step 2432B in the content holder list 241B (step 2433B).

FIG. 22 is a flowchart illustrating an example of the timer event receiving operation 244B in the content selecting part 24B. When the content selecting part 24B receives a timer event from the timer 26, the content selecting part 24B activates the timer event receiving operation 244B (step 2441B). The content selecting part 24B acquires the current year, month, day, hour, minute and second from the clock 25 (step 2442B).

The content selecting part 24B searches the content holder list 241B for an entry in which the time elapsed between the last download date and time and the current date and time is greater than or equal to a predetermined period of time (for example two months) by using the current date and time acquired at step 2442B as a key (step 2443B).

If an entry that meets the criteria is found at step 2443B, the operation proceeds to step 2445B. If no entry that meets the criteria is found, the operation proceeds to step 2446B (step 2444B). The entry found at step 2444B is deleted (step 2445B).

The timer 26 is set so as to activate the timer event receiving operation 244B after a predetermined period of time (for example one month) has elapsed, and then the timer event receiving operation 244B ends (step 2446B).

A push delivery method using the present system will be described below in detail with reference to FIG. 14. In an example of the fourth exemplary embodiment described below, the owner of a mobile terminal 1 which has a service agreement in Japan (country code "81") and a telephone number, 09012341234, has roamed out into Singapore (MCC "525") with the mobile terminal 1, and information is delivered to the roaming-out terminal 1.

It is assumed here that an administrator of the delivery apparatus 2 has been registered the standard-version content and the simplified-version content illustrated in FIGS. 4 and 5 in the content server 23 beforehand and has set the delivery conditions including the delivery periods, days of weeks, time slots, visited domain MCCs and subscription country codes illustrated in FIG. 16.

It is also assumed that the timer event receiving operation 244B has been performed on activation of the delivery apparatus 2 and is subsequently performed at regular intervals. Likewise, the content storing operation 163 has been performed on startup of the mobile terminal 1 and is subsequently performed at regular intervals. It is assumed that the mobile terminal 1 automatically sets a roaming destination network but data roaming is disabled on the mobile terminal 1.

"Content Storing Operation"

When the owner of the mobile terminal 1 which has a service agreement in Japan (country code "81") and has a telephone number, 09012341234, powers on the mobile terminal 1 when the owner is in Japan (when packet communication is available) or in an environment where a wireless LAN is available such as a hotel in a visited domain, the content storing operation 163 is activated (it is assumed here that a wireless LAN is available).

The content storing part 16 asks the wireless LAN communication part 13 and the packet communication part 14 whether the Internet 6 is available or not and receives a notification that the Internet connection is available from the wireless LAN communication part 13. The content storing part 16 presents the telephone number (819012341234) of the mobile terminal 1 to the Web server 21B through the wireless LAN communication part 13, a wireless LAN access point 3 and the Internet 6, downloads all of the standard-version contents 232 stored on the content server 23B through the Internet 6, the wireless LAN access point 3, and the wireless LAN communication part 13, and stores the contents.

The Web server 21B issues a content acquisition notification including the telephone number (819012341234) of the mobile terminal 1 to the content selecting part 24B.

When the content selecting part 24B receives the content acquisition notification from the Web server 21B, the content selecting part 24B acquires the current year, month, day, hour, minute, and second from the clock 25 (here, Jan. 3, 2012, 23:45:12, is assumed) and records the telephone number (819012341234) of the mobile terminal 1 and the current year, month, day, hour, minute and second (20120103234512) on the content holder list 241B.

"Location Registering Operation"

When the owner of the mobile terminal 1 brings the mobile terminal 1 into Singapore (MCC "525") and powers on the mobile terminal 1, the SMS receiving part 15 registers presence information with the visited-domain location registration server 8 through a non-packet mobile communication base station 5 or a packet-capable mobile communication base station 4. At this point in time, the ID of a network (MCC/MNC, for example 525-01) of the network in the area where the mobile terminal 1 is located and the subscriber number (819012341234) are sent to the visited-domain location registration server 8 through a common channel signaling network.

The visited-domain location registration server 8 receives the presence information (location registration information) of the mobile terminal 1 from the packet-capable mobile communication base station 4 or the non-packet mobile communication base station 5 through the common channel signaling network (SS7). Since in this instance the mobile phone carrier to which the mobile terminal 1 subscribes, which can be identified from the telephone number of the mobile terminal 1, is not the mobile phone carrier managing the visited-domain location registration server 8 (roaming-in as viewed from the carrier managing the visited-domain location registration server 8), the location information is registered in the home-domain location registration server 9 of the mobile terminal 1. The visited-domain location registration server 8 provides the telephone number (819012341234) of the mobile terminal 1 and the MCC (525) and MNC (01) of the network to which the visited-domain location registration server 8 belongs to the home-domain location registration server 9.

The home-domain location registration server 9 receives the presence information (location registration information) of the mobile terminal 1 from the visited-domain location registration server 8 through the common channel signaling network (such as SS7). In response to the registration of the presence information, the home-domain location registration server 9 detects that the subscriber to its service has roamed out into a network of Singapore. Then the home-domain location registration server 9 provides the MCC (525) of the visited domain and the subscriber number (819012341234) to the content selecting part 24B.

When the content selecting part 24B receives the MCC (525) of the visited domain and the subscriber number (819012341234) from the location registration server 9, the content selecting part 24B searches the content holder list 241B by using the subscriber number (819012341234) as a key. The search shows that a content has been downloaded at 23:45:12 on Jan. 3, 2012 and held by the mobile terminal 1 (see FIG. 17).

The content selecting part 24B searches the content management table 231B for a content that meets criteria using the current date, day of the week, time, the visited country MCC, and the subscription country code as keys. Here, the search is performed by using the criteria, Jan. 5, 2012, Thursday (day-of-the-week code "4"), 14:51:23, the visited domain MCC "525", and the country code "81", to find a content ID "00001" (see FIG. 16).

The content selecting part 24B instructs the SMS sending part 22 to send the content ID (00001) obtained as a result of searching the content management table 231B to "819012341234". Before sending, an identifier indicating a content ID and the content ID (here, PUSH=00001) are prepended to the body text of a SMS message.

The SMS sending part 22 sends the body text received from the content selecting part 24B to the SMS receiving part 15 through the telephone network 7 and the packet-capable mobile communication base station 4 or the non-packet mobile communication base station 5. The SMS receiving part 15 receives the SMS message and sends an SMS receipt notification to the display controller 12B.

The display controller 12B receives the SMS receipt notification from the SMS receiving part 15 and acquires the body text. Since the identifier indicating a content ID and the content ID (PUSH=00001) are prepended to the body text, the display controller 12B determines that the incoming SMS message is a content ID notification. At this point in time, the display controller 12B extracts the content ID "00001" from the body text.

The display controller 12B presents the content ID (00001) to the content storing part 16 to request a standard-version content. The display controller 12B searches the content management table 161 for the file name of a standard-version content corresponding to the content ID "00001" and acquires the standard-version file (00001.htm) from the content storing part 16 (see FIG. 15). The display controller 12B displays the acquired standard-version file (00001.htm) on the display 11.

According to the fourth exemplary embodiment, when a mobile terminal 1 is located in an region where a packet network is not available or when data roaming rejection is set on a mobile terminal 1, the mobile phone carrier to which the mobile terminal 1 subscribes (with which the mobile terminal 1 has a service agreement) or a service provider having an agreement with the mobile phone carrier can push information to the mobile terminal 1 located in the area of a visited network (that is, the roaming-out mobile terminal 1).

While only the telephone numbers of content holders and the last download dates and times are managed on the content holder list 241B, the versions and types of contents downloaded to mobile terminals 1 may also be managed and sending of SMS messages may be controlled according to the versions and types of contents stored on the mobile terminals 1, such as preventing sending of an SMS message to a mobile terminal 1 when only an old version is stored on the mobile terminal 1.

While all of the contents are downloaded in the content storing operation 163 in the foregoing description, only those contents that the owner of the mobile terminal 1 desires may be acquired instead of acquiring all available contents.

A program of a push delivery method will be described as a fifth exemplary embodiment of the present invention. A computer and a program storage, not depicted, are provided in any of the delivery apparatuses 2 illustrated in FIGS. 1, 10, 11 and 14. The computer controls at least the content server 23, the content selecting pat 24, the WEB server 21 and the SMS sending part 22 in the delivery apparatus 2.

The program storage, on the other hand, sores programs representing the operation procedures of the delivery apparatus 2 illustrated in the flowcharts of FIGS. 7, 8, 9, 13, 20, 21 and 22. The computer of the delivery apparatus 2 reads the programs from the program storage and controls at least the content server 23, the content selecting part 24, the Web server 21 and the SMS sending part 22 according to the programs. Details of the controls have been described above and further description of the controls will be omitted here.

As has been described, the fifth exemplary embodiment of the present invention provides a program of a push delivery method capable of providing a content based on the location of a user and up-to-date information to the user in a situation where a packet network is not available.

The exemplary embodiments described above are applicable to push delivery of information from a mobile phone carrier to which a mobile terminal 1 subscribes or a service provider having an agreement with the mobile phone carrier to the mobile terminal 1 located in the area of a network of a visited domain (that is, the loaming-out mobile terminal) when the mobile terminal 1 is in a region where a packet network is not available or data roaming is disabled on the mobile terminal 1 to reject the use of data roaming.

The exemplary embodiments described above are also applicable to push delivery of information from a mobile phone carrier in an area where a mobile terminal 1 is visiting (visited area) or a service provider having an agreement with the mobile phone carrier in the visited area to the mobile terminal 1 located in the area of a network of the mobile phone carrier or the service provider (that is the loaming-in mobile terminal 1) when the mobile terminal 1 is in a region where a packet network is not available or data roaming is disabled on the mobile terminal to reject the use of data roaming.

While the present invention has been described with respect to the exemplary embodiments, the present invention is not limited to the exemplary embodiments described above. Various modifications that will be understood by those skilled in the art can be made to the configurations of the present invention without departing from the scope of the present invention and any combination of the exemplary embodiments described above is possible.

Some or all of the exemplary embodiments described above can be described as in the following supplementary notes but are not limited to these notes.

(Supplementary note 1) A push delivery method including the steps of:

sending information indicating which of contents kept in the delivery apparatus is to be received by a mobile terminal through a packet network to the mobile terminal in a first text message through a telephone network; and delivering a second text message to the mobile terminal through the telephone network if the mobile terminal does not acquire the content within a predetermined period of time after sending the first text message, the second text message being a simplified version of the content.

(Supplementary note 2) The push delivery method according to supplementary note 1, including the steps of:

when information indicating that the mobile terminal has roamed out is received through a server, determining a content ID indicating a content to be displayed, on the basis of the current date, day of the week, time, the MCC (Mobile Country Code) of a country in which the mobile terminal is located, and the country code of a country in which the mobile terminal has a subscription;

sending a text message including the content ID and an identifier indicating that the message contains a content ID to the mobile terminal; and sending a concatenated SMS message including a simplified-version content and an identifier indicating that the message includes the simplified-version content to the mobile terminal if a content acquisition notification does not arrive from the Web server within a predetermined period of time after sending the text message.

(Supplementary note 3) The push delivery method according to supplementary note 2, wherein the concatenated SMS message has two telephone numbers, one for use in sending a content ID and the other for use in sending a simplified-version content, and communicates the type of the message using any one of the two telephone numbers instead of an identifier to the mobile terminal.

(Supplementary note 4) A mobile terminal including a portion for storing contents kept in a delivery apparatus from the delivery apparatus into a content storing part beforehand through a packet network, for receiving information to be displayed on the mobile terminal through a telephone network in the form of a text message when the mobile terminal roams out of the range of the delivery apparatus, and for acquiring a content specified at the delivery apparatus from the content storing part.

(Supplementary note 5) The mobile terminal according to supplementary note 4, including:

an SMS receiving part for receiving a text message including a content ID indicating a content to be displayed and an identifier indicating that the message includes the content ID;

a wireless LAN communication part for communicating with a Web server through a wireless LAN;

a packet communication part for communicating with the Web server through a packet network;

a timer for activating a content acquisition procedure at a set time;

a content storing part for acquiring a plurality of contents from the Web server and for storing the plurality of content; and a display controller for retrieving a content corresponding to a content ID included in a text message from the content storing part and displaying the content.

According to the present invention, contents based on the location of users and up-to-data information can be provided to the users when a packet network is not available.

What is claimed is:

1. A push delivery apparatus comprising:
a portion for sending information indicating which of contents kept in the delivery apparatus is to be received by a mobile terminal through a packet network to the mobile terminal in a first text message through a telephone network and for delivering a second text message to the mobile terminal through the telephone network if the mobile terminal does not acquire the content to be received by the mobile terminal within a predetermined period of time after sending the first text message, the second text message being a simplified version of the content;
a content selecting part for determining a content ID indicating a content to be displayed and a timing of displaying the content when information indicating that the mobile terminal has roamed out is received through a server;
an SMS sending part for sending a text message including the content ID and an identifier indicating that the text message includes the content ID to the mobile terminal;
a Web server for issuing a content acquisition notification including a telephone number of the mobile terminal and the content ID of the content when the content is acquired by the mobile terminal; and
a timer for activating, at a set time, a procedure for checking arrival of the content acquisition notification;
wherein the content selecting part sends a concatenated SMS message including a simplified version of the content and an identifier indicating that the message includes the simplified-version of the content to the mobile terminal by using the SMS sending part if a content acquisition notification does not arrive from the Web server within a predetermined period of time after sending the text message including the content ID and the identifier.

2. The push delivery apparatus according to claim 1, wherein the second text message which is the simplified version of the content is sent to the mobile terminal located in a roaming destination through a mobile phone carrier to which the mobile terminal subscribes.

3. The push delivery apparatus according to claim 1, wherein the second text message which is the simplified version of the content is sent to the mobile terminal located in a roaming destination through a service provider having an agreement with a mobile phone carrier to which the mobile terminal subscribes.

4. The push delivery apparatus according to claim 1, wherein, instead of sending information indicating which of contents kept in the delivery apparatus is to be received by the mobile terminal through a packet network to the mobile terminal in a text message through the telephone network, a text message which is a simplified version of a content specified at the delivery apparatus is immediately sent to the mobile terminal through the telephone network.

5. The push delivery apparatus according to claim 1, wherein the content selecting part determines the content ID of the content to be displayed on the basis of the current date, day of the week, time, the MCC (Mobile Country Code) of a country in which the mobile terminal is located and the country code of a country in which the mobile terminal has a subscription.

6. The push delivery apparatus according to claim 1, wherein the SMS sending part has two telephone numbers, one for use in sending a content ID and the other for use in sending a simplified version of a content, and communicates the type of a message to the mobile terminal by using any one of the two telephone numbers instead of an identifier.

7. A mobile terminal comprising:
a portion for receiving, from a delivery apparatus through a telephone network, information indicating which of contents kept in the delivery apparatus is to be received through a packet network in a text message when the mobile terminal roams out and, when the mobile terminal cannot receive a content specified by the delivery apparatus, for acquiring a text message which is a simplified version of the content from the delivery apparatus through the telephone network;
an SMS receiving part for receiving a text message including a content ID indicating a content to be displayed and an identifier indicating that the text message includes the content ID or a concatenated includes the simplified-version of the content;
a wireless LAN communication part for communicating with a Web server through a wireless LAN;
a packet communication part for communicating with the Web server through the packet network; and
a display controller for acquiring and displaying the content corresponding to the content ID included in the text message from the Web server and for displaying the simplified-version content included in the concatenated SMS message.

8. A push delivery system comprising:
a push delivery apparatus including a content selecting part for determining a content ID
indicating a content to be displayed and a timing of displaying the content, an SMS sending part for sending a text message including the content ID and an identifier indicating that the text message includes the content ID, a Web server for issuing a content acquisition notification including a telephone number of a terminal which has acquired a content and a content ID of the content when the content has been acquired, and a timer for activating a procedure for checking arrival of the content acquisition notification at a set time; and a mobile terminal including an SMS receiving part for receiving a text message including a content ID indicating a content to be displayed and an identifier indicating that the text message includes the content ID or a concatenated SMS message including a simplified-version of the content and an identifier indicating that the message includes the simplified-version of the content, a wireless LAN communication part for communicating with the Web server through a wireless LAN, a packet communication part for communicating with the Web server through a packet network, and a display controller for acquiring and displaying the content corresponding to the content ID included in the text message from the Web server and for displaying the simplified-version content included in the concatenated SMS message;

wherein the content selecting part sends a concatenated SMS message including a simplified version content to the mobile terminal if a content acquisition notification does not arrive from the Web server within a predetermined period of time after sending the text message from the SMS sending part.

9. The push delivery system according to claim 8, wherein the SMS sending part has two telephone numbers and communicates the type of a message to the mobile terminal by using any one of the two telephone numbers instead of an identifier, one of the two telephone numbers being for use in sending a content ID and the other being for use in sending a simplified-version of a content.

* * * * *